United States Patent [19]
Sasaki

[11] Patent Number: 5,781,873
[45] Date of Patent: Jul. 14, 1998

[54] APPARATUS AND METHOD FOR CONTROLLING DAMPING FORCE CHARACTERISTIC OF VEHICULAR SUSPENSION SYSTEM

[75] Inventor: Mitsuo Sasaki, Atsugi, Japan

[73] Assignee: Unisia Jecs Corporation, Atsugi, Japan

[21] Appl. No.: 536,751

[22] Filed: Sep. 29, 1995

[30] Foreign Application Priority Data

Sep. 29, 1994 [JP] Japan ..................... 6-235468

[51] Int. Cl.$^6$ .................................. B60G 17/015
[52] U.S. Cl. ................. 701/37; 188/281; 280/707
[58] Field of Search ............... 364/424.046; 188/280, 188/299, 281; 280/707; 701/37, 38

[56] References Cited

U.S. PATENT DOCUMENTS

| | | | |
|---|---|---|---|
| 4,696,489 | 9/1987 | Fujishiro et al. | 280/707 |
| 4,921,272 | 5/1990 | Ivers | 280/707 |
| 4,936,425 | 6/1990 | Boone et al. | 188/299 |
| 5,016,908 | 5/1991 | Athanas et al. | 280/707 |
| 5,020,825 | 6/1991 | Lizell | 280/707 |
| 5,289,380 | 2/1994 | Kimura . | |
| 5,328,202 | 7/1994 | Kakizaki | 280/707 |
| 5,377,107 | 12/1994 | Shimizu et al. . | |
| 5,483,450 | 1/1996 | Titli et al. . | |
| 5,488,556 | 1/1996 | Sasaki | 364/424.046 |
| 5,515,273 | 5/1996 | Sasaki et al. | 364/424.046 |
| 5,572,426 | 11/1996 | Sasaki et al. | 364/424.046 |

FOREIGN PATENT DOCUMENTS

| | | |
|---|---|---|
| 0 622 255 | 11/1994 | European Pat. Off. . |
| 41 37 712 | 5/1992 | Germany . |
| 41 39 692 | 6/1992 | Germany . |
| 61-163011 | 7/1986 | Japan . |
| 4-63712 | 2/1992 | Japan . |

*Primary Examiner*—Michael Zanelli
*Assistant Examiner*—Edward Pipala
*Attorney, Agent, or Firm*—Foley & Lardner

[57] ABSTRACT

In apparatus and method for controlling a damping force characteristic for a vehicular suspension system, a control force (F) based on an ideal Sky Hook theory is generated even when a low responsive characteristic and less expensive actuator such as a stepping motor associated with an adjuster of each shock absorber and which is not enabled to respond to an unsprung mass resonance frequency and a control signal based on a sprung mass vertical velocity and on a relative velocity between a vehicle body (sprung mass) and a road wheel assembly (unsprung mass) is formed using a signal processing circuit so that the control signal is formed in a low frequency band. The damping force characteristic of each shock absorber is controlled on the basis of the formed control signal.

28 Claims, 16 Drawing Sheets

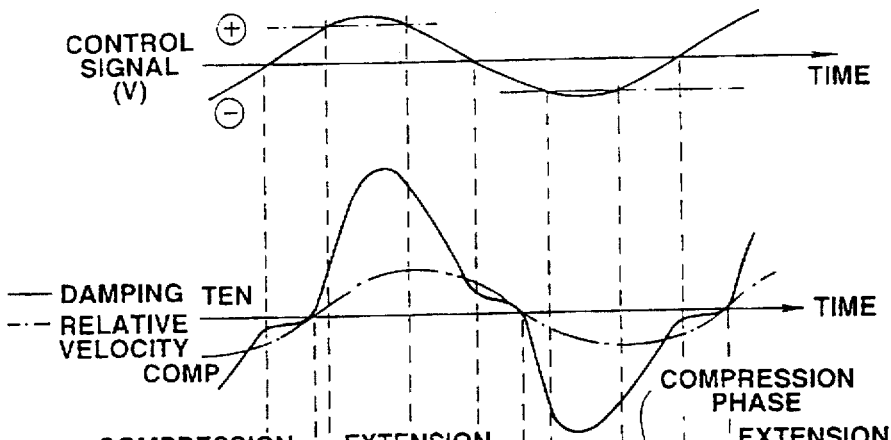

APPARATUS AND METHOD FOR CONTROLLING DAMPING FORCE CHARACTERISTIC OF VEHICULAR SUSPENSION SYSTEM

BACKGROUND OF THE INVENTION

1. Field of the Invention

The present invention relates to apparatus and method for optimally controlling a damping force characteristic of a vehicular suspension system of an automotive vehicle.

2. Description of Background Art

A Japanese Patent Application First Publication No. Showa 61-163011 exemplifies a first previously proposed suspension system damping force characteristic controlling apparatus, the suspension system having a plurality of shock absorbers.

In the first previously proposed suspension damping force characteristic controlling apparatus, a sprung mass vertical velocity indicative signal and a relative velocity indicative signal between a sprung mass of a vehicle body and unsprung mass of a corresponding road wheel, the sprung mass and unsprung mass being located at a position adjacent to each shock absorber, are detected and outputted.

If direction discriminating signs of the sprung mass vertical velocity indicative signal and the relative velocity indicative signal are coincident with each other, the damping force characteristic of the corresponding one of the shock absorbers is set to a hard characteristic. If either one of the sprung mass vertical velocity signal and the unsprung mass vertical velocity signal is not coincident with the other of both of velocity signals, the damping force characteristic of the corresponding one of the shock absorbers is set to a soft characteristic. In this way, the damping force characteristic controls based on a Sky Hook theorem (theory) are carried out individually for the respective shock absorbers and independently of each other.

In addition, a Japanese Patent Application First Publication No. Heisei 4-63712 exemplifies a second previously proposed suspension system damping force characteristic controlling apparatus, the suspension system having the plurality of shock absorbers.

In the second previously proposed suspension damping force characteristic controlling apparatus, such a shock absorber as having a first mode in which the hard characteristic is exhibited in an extension phase with the soft characteristic exhibited in a compression phase and a second mode in which the hard characteristic is exhibited in the compression phase with the soft characteristic exhibited in the extension phase is used for each shock absorber. Then, a switching control is carried out between the first and second modes according to a direction of the sprung mass vertical velocity $\Delta x$ (hereinafter, often simply referred to as a sprung mass velocity).

In more details, in the second previously proposed suspension damping force characteristic controlling apparatus, when the direction discriminating sign of the sprung mass vertical velocity signal $\Delta x$ indicates upward (namely, plus+), the damping force switching control is switched to the first mode so that the hard damping force characteristic is exhibited in the extension phase. When the direction discriminating sign of the sprung mass vertical velocity indicates downward (namely, minus−), the damping force characteristic is switched to the second mode so that the hard damping characteristic is exhibited in the compression phase. Then, the hard damping force characteristic to be controlled in either of the extension or compression phase is further controlled to provide a damping force characteristic position P proportional to the magnitude of the sprung mass velocity $\Delta x'$ so that in a damping suppression region in which both direction discriminating signs of the sprung mass vertical velocity $\Delta x'$ and relative velocity $(\Delta x'-\Delta x'_0)$ between the sprung mass and unsprung mass (hereinafter, often simply referred to as a relative velocity) are coincident with each other, the damping characteristic at either one of the extension or compression phase which is required to be controlled at this time of coincidence of direction discriminating signs is further controlled so that its hard damping force characteristic is proportional to the sprung mass velocity $\Delta x'$ and in an oscillation applied region in which both of the direction discriminating signs thereof are not coincident with each other, the damping force characteristic at either one of the extension or compression phase which is required to be controlled is controlled so as to provide a predetermined low (soft) damping force. The second previously proposed suspension damping force controlling apparatus can achieve, with a rather simple construction, such a basic Sky Hook theorem as described above.

In each of the first and second previously proposed suspension damping force controlling apparatuses, the sprung mass vertical velocity $\Delta x'$ is derived by integrating or passing through a low pass filter a sprung mass vertical acceleration signal detected by a sprung mass vertical acceleration sensor installed at the corresponding vehicle body position. In addition, the relative velocity between the sprung mass and unsprung mass is derived by differentiating or passing through a high pass filter a relative displacement indicative signal outputted by a stroke sensor installed on the corresponding unsprung mass.

Furthermore, in each of the first and second previously proposed suspension damping force controlling apparatuses, it is possible to perform a basic Sky Hook theorem control according to either one of the extension or compression phase of the shock absorber to be controlled. In an ideal Sky Hook theorem based proportional control, a control force F is proportional to the sprung mass vertical velocity $\Delta x'$ as shown in an equation (1).

$$F = g \cdot \Delta x' \qquad (1),$$

wherein g denotes a control gain.

In each of the first and second previously proposed suspension damping force controlling apparatuses, however, a damping force coefficient C is proportional to the sprung mass vertical velocity $\Delta x'$ as follows:

$$C = g \cdot \Delta x' \qquad (2).$$

In other words, the equation of the ideal Sky Hook control is established as follows:

$$F = C(\Delta x' - \Delta x'_0) = g \cdot \Delta x' \qquad (3).$$

If the damping coefficient C is derived from the equation (3), the damping coefficient C is proportional to a signal indicating the sprung mass vertical velocity $\Delta x'$ divided by the relative velocity $(\Delta x' - \Delta x'_0)$, as shown in the following equation (4).

$$C = g \cdot \Delta x' / (\Delta x' - \Delta x'_0) \qquad (4).$$

However, in each of the first and second previously proposed suspension controlling apparatuses, the damping force coefficient C is only proportional to the sprung mass vertical velocity $\Delta x'$. Therefore, the control force F is varied according to the variation in the relative velocity $(\Delta x' - \Delta x'_0)$.

In more details, since, in each of the first and second previously proposed suspension damping force control apparatuses, the damping force coefficient C (=damping force characteristic position P of the corresponding one of the shock absorbers) is determined to a value only dependent on the magnitude of sprung mass vertical velocity $\Delta x'$. Therefore, in a case where the instantaneous relative velocity $(\Delta x' - \Delta x'_0)$ (=stroke velocity of the shock absorber) is different from the previous relative velocity even if the magnitude of the sprung mass vertical velocity $\Delta x'$ remains the same with time, an excessive or insufficient force is resulted in the control force F. That is to say, in a case where a certain value of the damping force characteristic position P (damping coefficient C) is determined for the sprung mass vertical velocity $\Delta x'$ at a certain time, the damping force C (control force F) gives only a small value when the instantaneous relative velocity $(\Delta x' - \Delta x'_0)$ is relatively small. Consequently, the control force F becomes insufficient against the sprung mass so that a vehicular driver feels as if he were riding the vehicle body in a very low frequency and a large magnitude of vibrations. On the other hand, if the instantaneous relative velocity $(\Delta x' - \Delta x'_0)$ is relatively large, the damping force C (control force F) becomes excessively large (strong). Therefore, the control force F becomes excessive against the sprung mass so that the vehicle driver feels as if he were riding the vehicle body in a relatively low frequency and a small magnitude of vibrations or in a relatively high frequency and a small magnitude of vibrations.

To cope with the above-described insufficiency and excessiveness of the damping force (control force), the relative velocity $(\Delta x' - \Delta x'_0)$ is detected in addition to the detection of the sprung mass vertical velocity $\Delta x'$ in each of the first and second previously proposed suspension damping force controlling apparatuses. Then, the damping force characteristic control for the corresponding one of the shock absorbers is carried out according to the control signal V $(=C = g \cdot \Delta x' / (\Delta x' - \Delta x'_0))$ formed by using the sprung mass vertical velocity signal $\Delta x'$ and relative velocity signal $(\Delta x' - \Delta x'_0)$ so that the above-described insufficiency and excessiveness of the control force can theoretically be solved.

However, a main component of the control signal V described above dominates a high-frequency wave signal due to a presence of an unsprung mass resonance frequency (10 through 15 Hz) included in the relative velocity signal $(\Delta x' - \Delta x'_0)$. Therefore, it is necessary to provide a highly responsive actuator in order to drive a switching of the damping force characteristic position P immediately responding to the high-frequency wave control signal.

That is to say, in a case where such an actuator as a low-cost (inexpensive) actuator having a relatively low responsive characteristic such as not to be able to respond to the unsprung mass resonance frequency, the switching of the damping force characteristic position P for the corresponding one of the shock absorbers cannot follow the variation in the control signal V. In other words, the control force cannot ideally be lowered due to the delay of the actuator in the switching of the damping force characteristic position P for the response to the control signal having the frequency corresponding to the unsprung mass resonance frequency. Consequently, the excessive control force is generated.

Although the above-described insufficiency and excessiveness of the control force can be solved by using such an actuator as having a high responsive characteristic to the control signal having a frequency equal to or above the unsprung mass resonance frequency, it is very difficult to manufacture such a highly responsive actuator as described above. Even if it is possible to manufacture the above-described actuator, the manufacturing cost becomes high. In addition, since the number of times the actuator is driven to switch the damping force characteristic position P are too many, a very high durability of such a highly responsive actuator as described above is required. Hence, it is very difficult to reduce the highly responsive actuator into practice.

SUMMARY OF THE INVENTION

It is an object of the present invention to provide apparatus and method for controlling a damping force of a vehicular suspension system which can achieve a control force based on the ideal Sky Hook theorem even though a relatively low responsive characteristic actuator such as to be unable to respond to an unsprung mass resonance frequency is used.

According to one aspect of the present invention, there is provided with an apparatus for a vehicular suspension system, said suspension system having shock absorber means interposed between a sprung mass of a vehicle body and unsprung mass of a corresponding one of road wheels, said apparatus comprising: a) damping force characteristic varying means, responsive to a drive command, for varying a damping force characteristic at either one of an extension or compression phase of said shock absorber means and for providing a relatively low damping force characteristic at the other of either of the extension or compression phase thereof; b) first detecting means for detecting a behavior of the vehicle body as the sprung mass and outputting a first signal indicating the behavior of the vehicle body; c) velocity converting means for converting the first signal outputted by said first detecting means into a second signal indicating a sprung mass vertical velocity of the sprung mass; d) second detecting means for detecting a relative displacement between the sprung mass and unsprung mass and outputting a third signal indicating a relative velocity between the sprung mass and the unsprung mass on the basis of the detected relative displacement therebetween; e) control signal forming means for forming and outputting a control signal on the basis of the second signal outputted by said velocity converting means and the third signal outputted by said second detecting means; and f) controlling means for controlling the damping force characteristic of said shock absorber means via said damping force characteristic varying means on the basis of said control signal such that, when a direction discriminating sign of the second signal outputted by said velocity converting means indicates upward with respect to the sprung mass, the damping force characteristic at the extension phase of said shock absorber means is variably controlled and , when said direction discriminating sign of said controlling means indicates downward with respect to the sprung mass, the damping force characteristic at the compression phase is controlled, which further comprises a low responsive characteristic actuator associated with said damping force characteristic varying means installed in said shock absorber means and wherein said control signal forming means forms the control signal in a relatively low frequency band such that a duty ratio between a drive and hold of said drive command generated according to the control signal to said actuator becomes relatively small when no variation in said control signal occurs and becomes half even when a variation in said control signal becomes relatively large so that said actuator follows the variation of said control signal.

According to another aspect of the present invention, there is provided with a method for controlling a damping force characteristic of a vehicular suspension system, said vehicular suspension system having shock absorber means which is interposed between a sprung mass of a vehicle body and an unsprung mass of a corresponding one of road wheels, said method comprising the steps of: a) detecting a behavior of the vehicle body as the sprung mass and outputting a first signal indicating the behavior of the vehicle body; b) converting the first signal outputted by said detecting means into a second signal indicating a sprung mass vertical velocity of the sprung mass; c) detecting a relative displacement between the sprung mass and unsprung mass and outputting a third signal indicating a relative velocity between the sprung mass and unsprung mass on the basis of the detected relative displacement therebetween; and d) generating and outputting the control signal according to the second signal outputted at said step b) and third signal outputted at said step c), said control signal being supplied to an actuator so that the damping force exerted by said shock absorber means is controlled, wherein said actuator is a low responsive characteristic actuator and wherein at said step d) the control signal in a relatively low frequency band is firmed such that a duty ratio between a drive and hold of a drive command generated according to the control signal to said actuator becomes relatively small when no variation in said control signal occurs and becomes half even when a variation in said control signal becomes relatively large so that said actuator follows the variation of said control signal.

BRIEF DESCRIPTION OF THE DRAWINGS

FIGS. 15A, 15B, 15C, 15D, and 15E are integrally a timing chart indicating a damping force characteristic control operation of a control unit in the first preferred embodiment according to the present invention.

BEST MODE CARRYING OUT THE INVENTION

Reference will hereinafter be made to the drawings in order to facilitate a better understanding of the present invention.

(First Embodiment)

Figure 1:
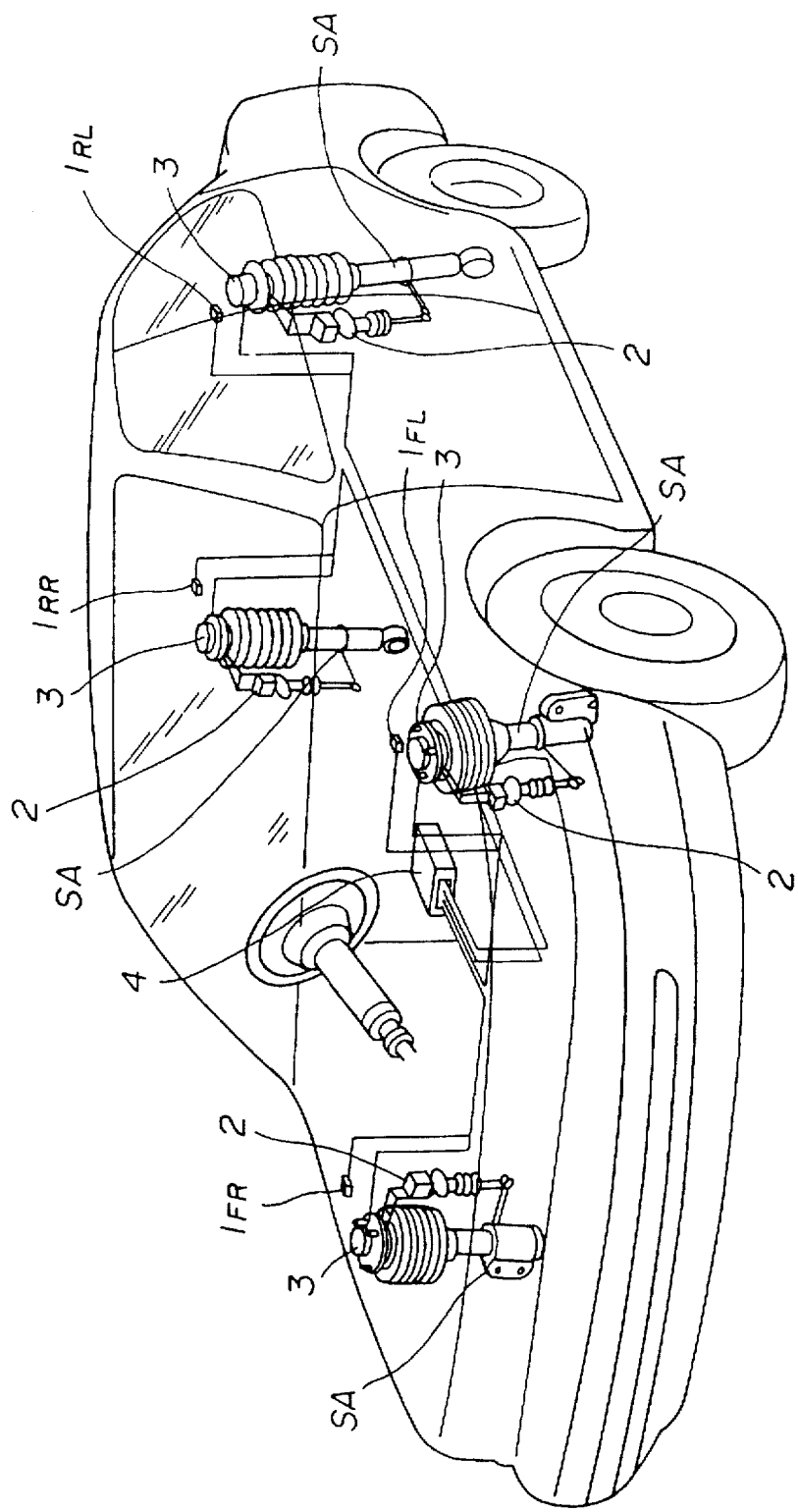
FIG. 1 is an explanatory view of an arrangement of a vehicular suspension system damping force controlling apparatus in a first preferred embodiment according to the present invention.

FIG. 1 shows a whole system configuration of a vehicular suspension system damping force characteristic controlling apparatus in a first preferred embodiment according to the present invention.

Four shock absorbers $SA_{FL}$, $SA_{FR}$, $SA_{RL}$, and $SA_{RR}$ (it is noted that subscripts FL denotes a front left road wheel side (position), FR denotes a front right road wheel side (position), RL denotes a rear left road wheel side (position), RR denotes a rear right road wheel side (position), and a representative shock absorber is simply denoted by SA since all shock absorbers (having the mutually same structures) are interposed between given parts of a vehicular body (sprung mass) and respective road (tire) wheels (unsprung mass). The road wheels comprise front left road wheel, front right road wheel, rear left road wheel, and rear right road wheels of the vehicle. It is noted that the above-described given parts of the vehicular body indicate front left and right road wheel positions and rear left and right road wheel positions.

As shown in FIG. 1, (vertical, i.e., upward and downward) acceleration (G; gravity) sensors 1 ($1_{FL}$, $1_{FR}$, $1_{RR}$, $1_{RL}$) are attached onto given parts of the vehicular body adjacent to the front left and right road wheel side and rear left and right road wheel side shock absorbers SA , each being provided to detect a vertical sprung mass acceleration (G) acted upon the sprung mass (vehicle body).

Stroke sensors 2 ( $2_{FL}$, $2_{FR}$, $2_{RL}$, and $2_{RR}$) are interposed between the corresponding vehicle body portion and corresponding road wheels and each thereof 2 is used to determine a relative velocity between the sprung mass and unsprung mass. Each stroke sensor 2 outputs a relative displacement signal H to a control unit 4 to determine the relative velocity between the sprung mass and unsprung mass.

A control unit 4 is installed at a given part of the vehicle to receive signals G derived from the acceleration sensors 1 ($1_{FR}$, $1_{FL}$, $1_{RR}$, $1_{RL}$) and from signals H from the respective stroke sensors 2 ($2_{FR}$, $2_{FL}$, $2_{RL}$, and $2_{RR}$), processes these signals, and outputs drive signals to respective actuators (.i.e., stepping motors) for the respective four shock absorbers SA on the basis of control signals (V) as will be described later.

Figure 2:
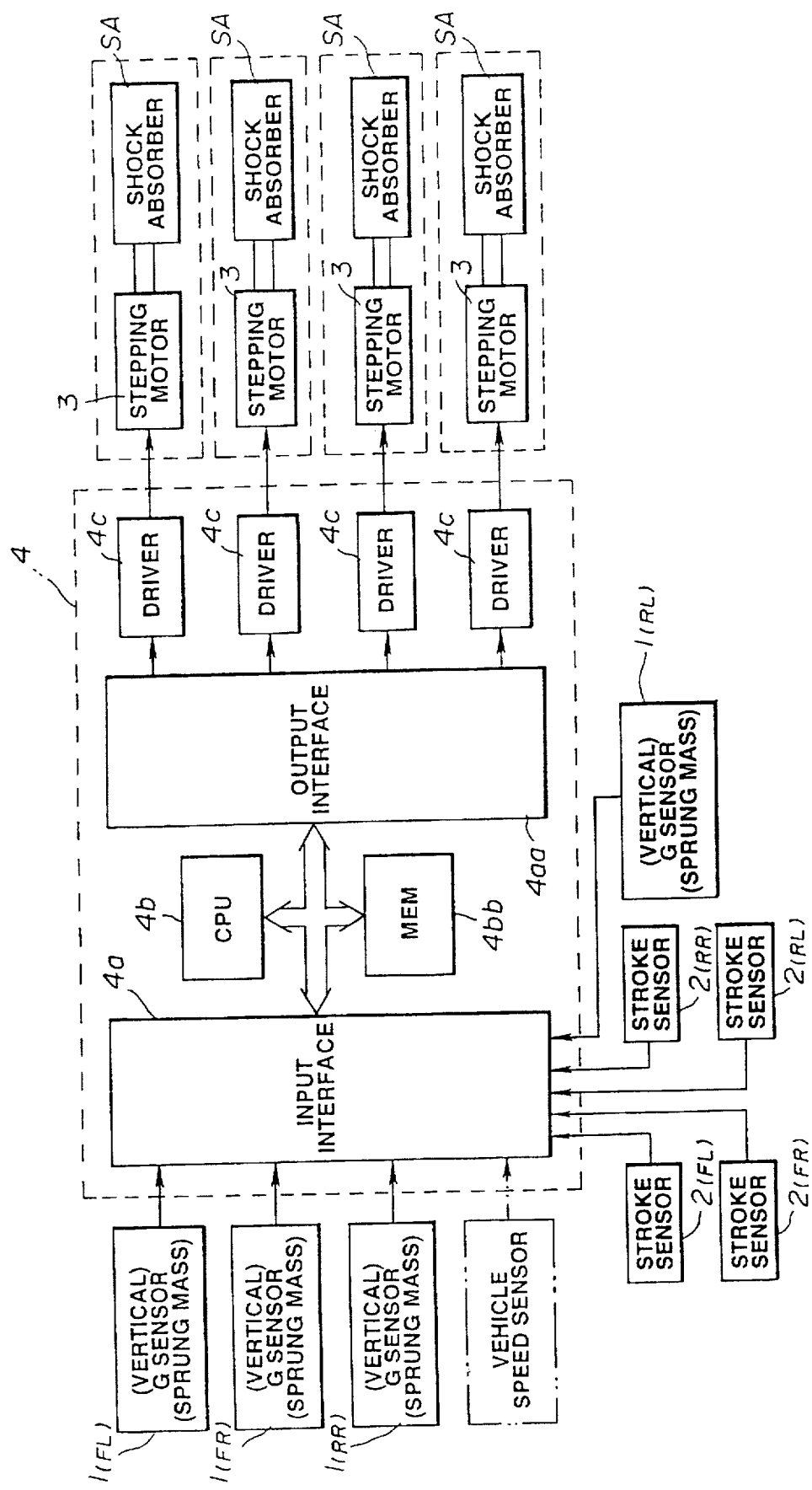
FIG. 2 is a circuit block diagram of a control unit and its peripheral circuits of the shock absorber damping force controlling apparatus shown in FIG. 1.

FIG. 2 shows a circuit block diagram of the vehicular shock absorber damping force controlling apparatus in the first embodiment according to the present invention shown in FIG. 1.

Referring to FIGS. 1 and 2, the control unit 4 is installed on a portion of the vehicular body near to a driver's seat. The control unit 4 includes: an input interface circuit 4a; a CPU (Central Processing Unit) 4b; a memory 4bb having a ROM (Read Only Memory) and a RAM (Random Access Memory); an output interface 4aa, and actuator driver circuits 4c; and a common bus.

The control unit 4 is provided with the respective drivers 4c connected between the output interface 4aa and the corresponding stepping motors 3.

Figure 13:
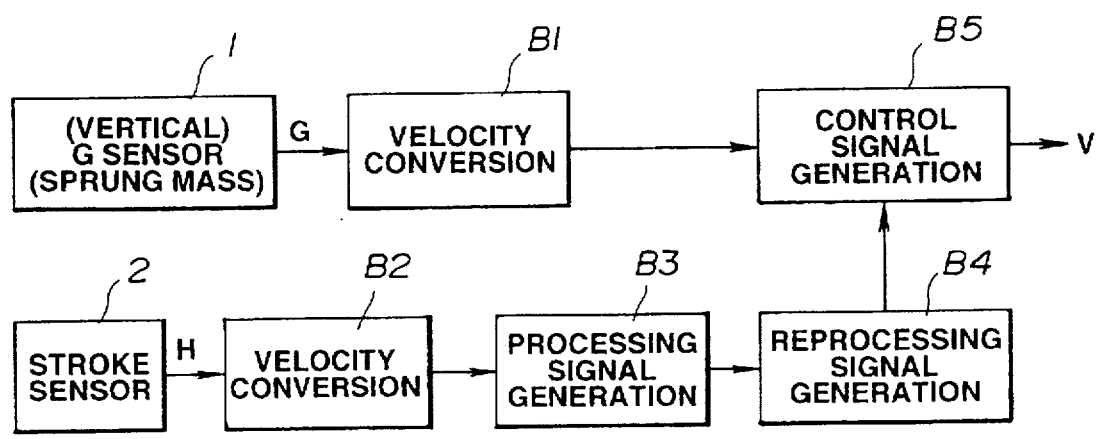
FIG. 13 is a circuit block diagram of a signal processing circuit in the suspension system damping force controlling apparatus in the first embodiment according to the present invention shown in FIG. 1 in which a control signal is formed for each of the shock absorbers.

The control unit 4 shown in FIG. 2 is provided with a signal processing circuit in terms of its hardware structure as shown in FIG. 13. The explanation of FIG. 13 will be described later.

Figure 3:
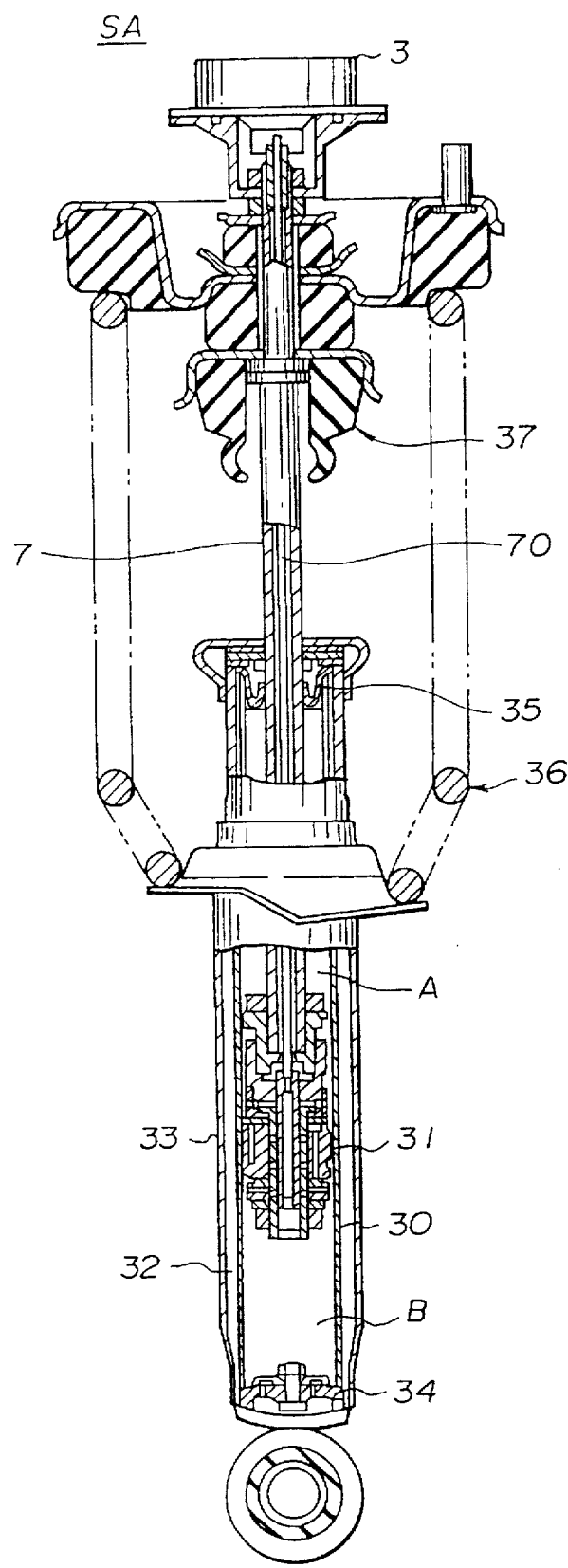
FIG. 3 is a partially sectional view of each shock absorber SA used in the first embodiment shown in FIGS. 1 and 2.

Next, FIG. 3 show a cross sectional view of each shock absorber SA shown in FIGS. 1 and 2.

The shock absorber SA, as shown in FIG. 3, includes: a cylinder 30, a (movable) piston 31 defining an upper portion chamber A and a lower portion chamber B; an outer envelope 33 in which a reservoir chamber 32 is formed on an outer peripheral end of the cylinder 30; a base 34 which defines the lower portion chamber B and the reservoir chamber 32; a guide member 35 which guides a sliding motion of a piston rod 7 with the other end of which the movable piston 31 is linked; a suspension spring 36 interposed between the outer envelope 33 and vehicle body: and a bumper rubber 37.

Each stepping motor 3 shown in FIGS. 1 and 2 is installed in an upper position of the corresponding one of the shock absorbers SA, as shown in FIG. 3, so as to operatively rotate an adjuster 40 (refer to FIG. 4) via a control rod 70 in response to a rotation drive signal from the corresponding one of the actuator drivers (circuits) 4c. A rotating shaft of the corresponding one of the stepping motors 3 is mechanically connected to the corresponding adjuster 40 within each shock absorbers SA via the control rod 70.

Figure 4:
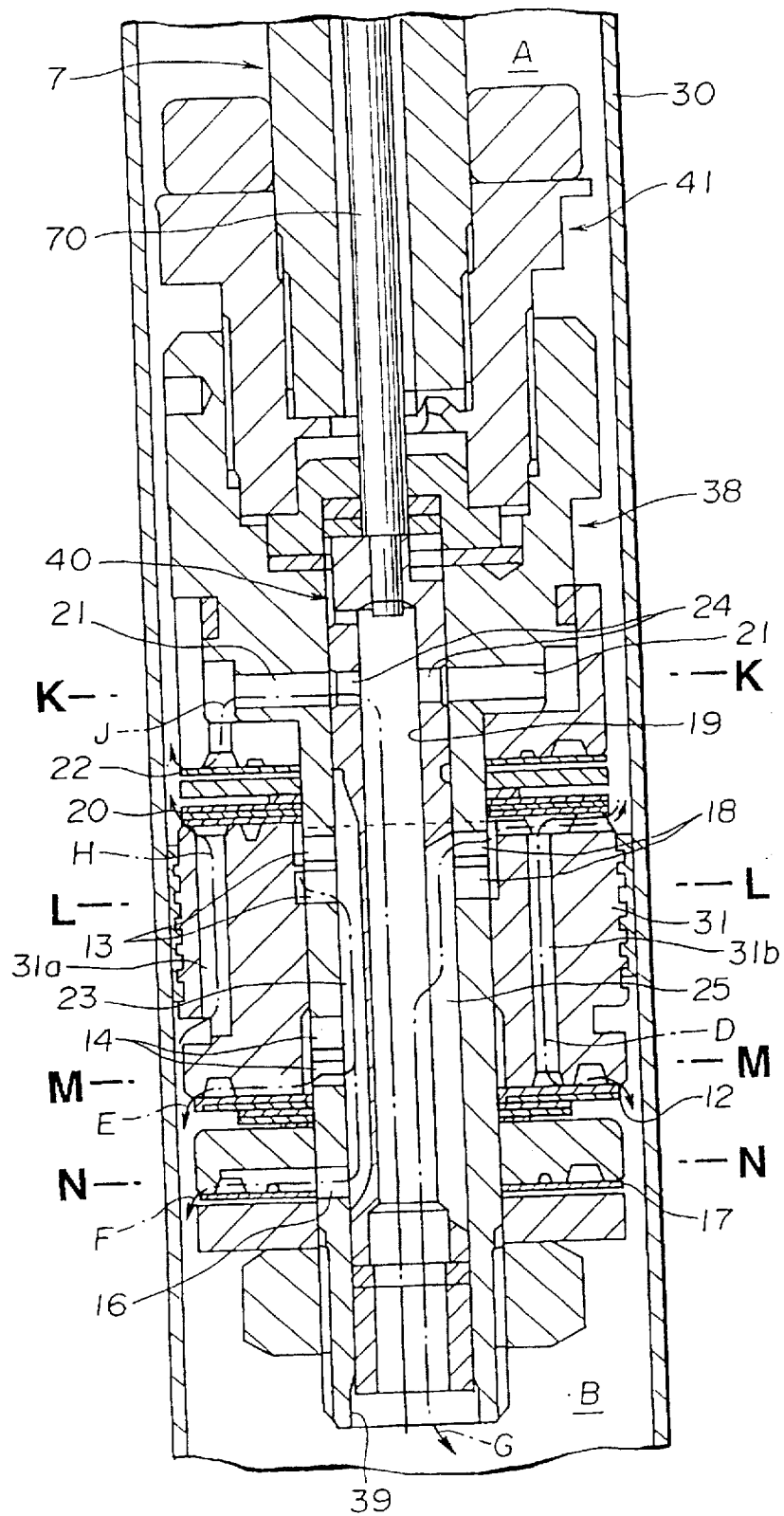
FIG. 4 is an enlarged, partially sectional view of the representative shock absorber SA shown in FIG. 3.

FIG. 4 shows an enlarged cross sectional view representing a part of the piston assembly 31 and its surrounding part of each of the shock absorbers SA.

As shown in FIG. 4, the piston 31 is formed with penetrating holes 31a and 31b therethrough. In addition, the piston 31 is provided with a compression phase attenuation valve 20 and an extension phase attenuating valve 12, both of the valves 20, 12 respectively opening and closing the respective penetrating holes 31a and 31b. A stud 38 is spirally meshed with and fixed to a bound stopper 41 spirally meshed with and fixed to a tip end of the piston rod 7.

The stud 38 is penetrated through the piston 31. In addition, the stud 38 is formed with a communication hole 39 so as to communicate the upper portion chamber A and the lower portion chamber B, the communication hole 39 forming flow passages (an extension phase second flow passage E, extension phase third flow passage F, bypass flow passage G, and compression phase second flow passage J as will be described later). Then, the adjuster 40 which changes flow passage cross sectional areas of the above-described flow passages is provided within the communication hole 39.

Furthermore, an extension stroke side (phase) check valve 17 and a compression (or contraction) stroke side (compression phase) check valve 22 are also installed on an outer periphery of the stud 38, which enable and disable the fluid flow through the above-described flow passages formed by the communication hole 39 in accordance with a direction of the flow of the fluid. As shown in FIG. 3, the adjuster 40 is rotatable by means of the corresponding one of the actuators (stepping motors) 3 via the control rod 70.

It is noted that the stud 38 is formed with a first port 21, a second port 13, a third port 18, a fourth port 14, and fifth port 16, respectively, in an upper order.

On the other hand, referring to FIG. 4, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and lower portion chamber B as the fluid flow passages when the piston stroke indicates the extension phase: that is to say, 1) an extension stroke side (phase) first flow passage D such that the fluid passes the penetrating hole 31b, a valve opened internal side of the extension stroke side (phase) attenuation valve 12, and reaches the lower portion chamber B; 2) an extension stroke side (phase) second flow passage E in which the fluid flows through the second port 13, the longitudinal groove 23, the fourth port 14, a valve opened outer peripheral side of the extension stroke side (phase) attenuation valve 12, and reaches the lower portion chamber B; 3) an extension stroke side (phase) third flow passage F in which the fluid passes through the second port 13, the longitudinal groove 23, and the fifth port 16; and 4) a bypass flow passage G in which the fluid passes through the third port 18, the second lateral hole 25, and the hollow portion 19 and reaches the lower portion chamber B.

In addition, the three fluid flow passages through which the fluid can be caused to flow during the compression stroke side (phase) of the piston 31 include: 1) a compression stroke side (phase) first flow passage H in which the fluid flows through the penetrating hole 31a and valve opened compression stroke side (phase) attenuation valve 20; 2) a compression stroke side (phase) second flow passage J in which the hollow portion 19, the first lateral hole 24, the first port 21, and the opened compression stroke side (phase) check valve 22 and reaches the upper portion chamber A; and 3) the bypass passage G in which the fluid flows through the hollow portion 19, the second lateral hole 25, and the third port 18.

Figure 5:
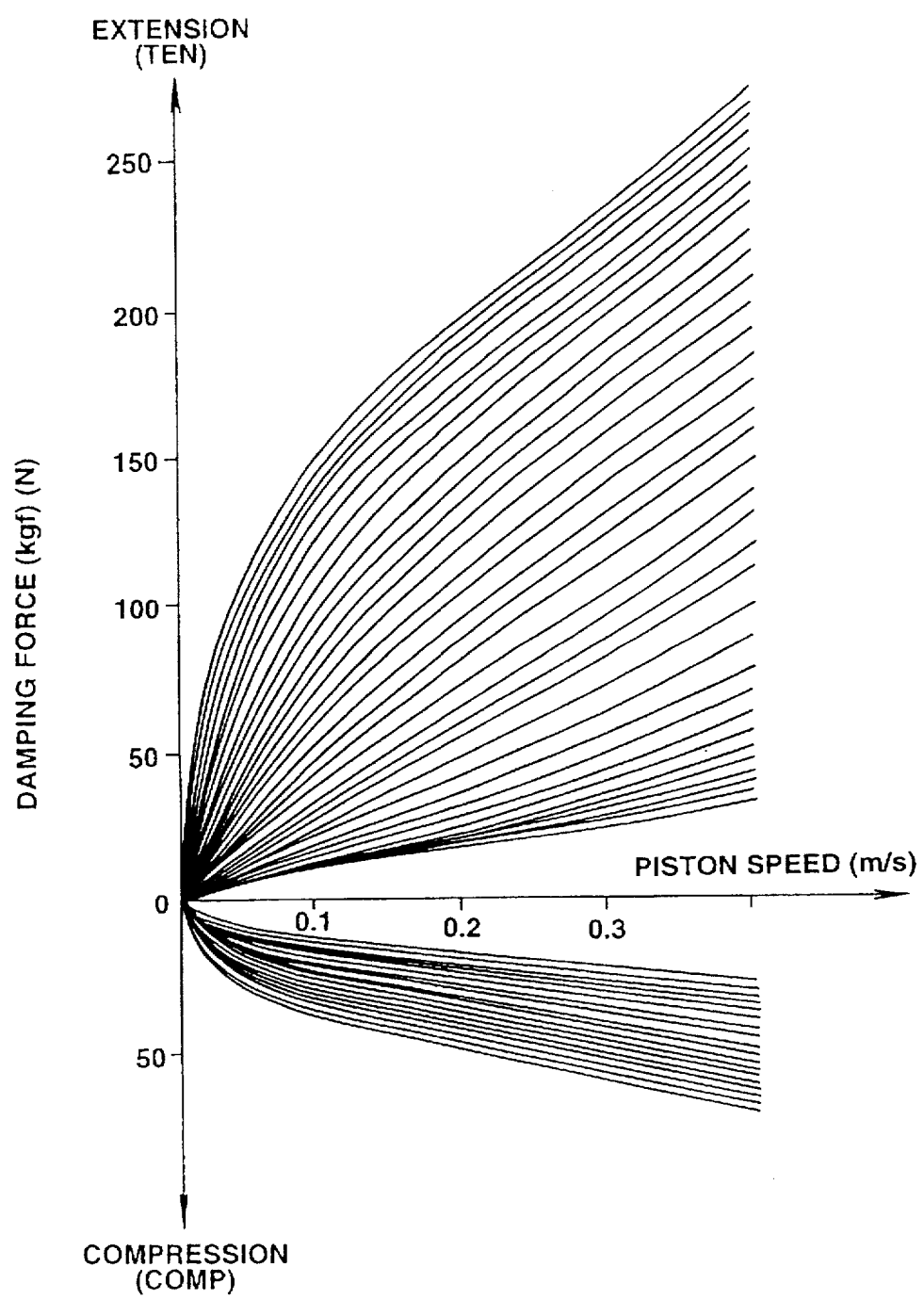
FIG. 5 is a characteristic graph representing damping forces with respect to a piston speed of the representative shock absorber SA shown in FIGS. 3 and 4.

In summary, the shock absorber SA is so arranged and constructed as to be enabled to change the damping force characteristics at a multiple stage in its damping characteristic, as shown in FIG. 5, either in the extension phase or compression phase when the adjuster 40 is pivoted according to the rotation of the corresponding one of the stepping motors 3.

Figure 6:
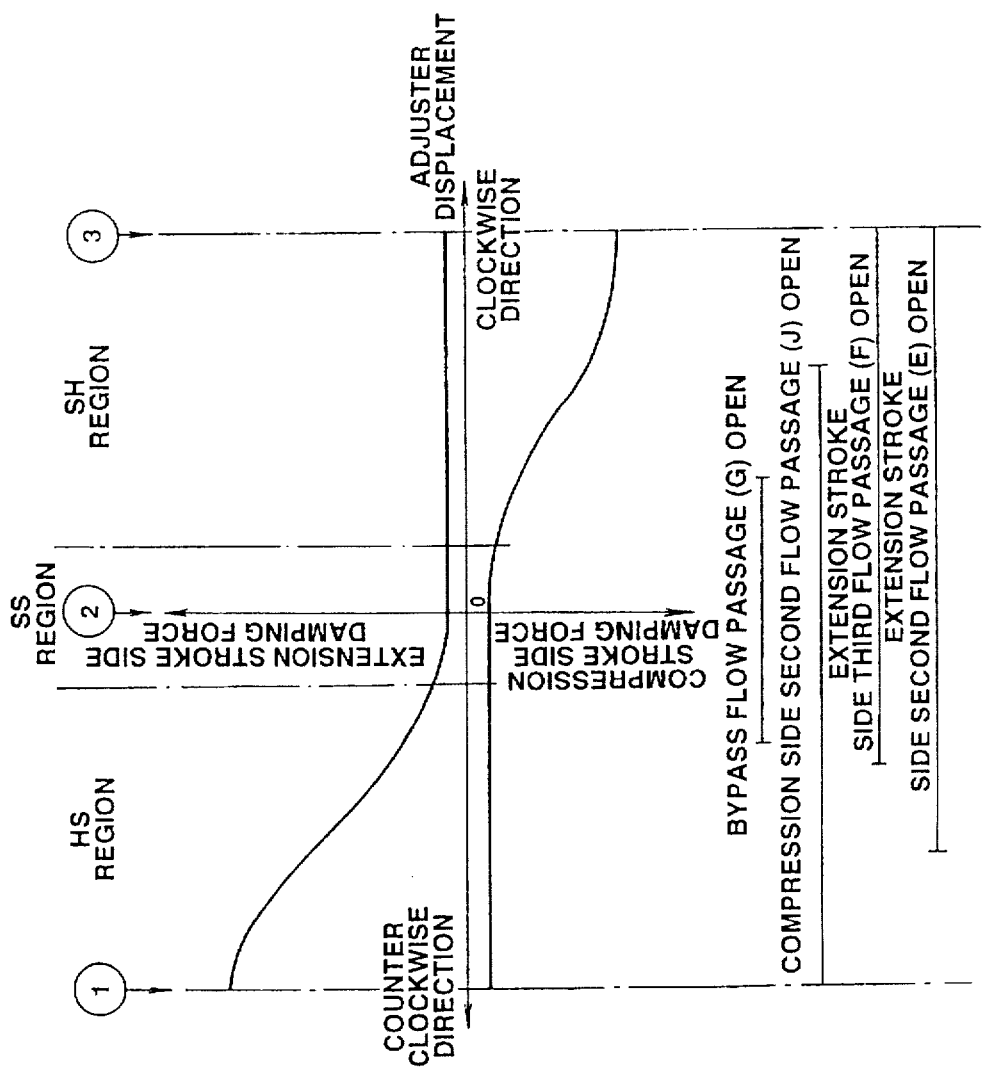
FIG. 6 is a damping coefficient characteristic graph representing damping force control regions corresponding to stepped positions of an adjuster installed in the representative shock absorber SA associated with a stepping motor according to the rotation of the representative pulse (stepping) motor shown in FIGS. 2 and 3.

FIG. 6 shows relationships between the rotated position of the adjuster 40 and damping force characteristics at both the extension stroke (phase) and compression phase with respect to the piston 31.

In details, as shown in FIG. 6, when the adjuster 40 is pivoted in a given counterclockwise direction from a generally center position at which both of the extension and compression phases are in soft damping force characteristic positions (hereinafter, referred to as a soft region SS), the damping force coefficient at the extension stroke side (phase) can be changed at the multiple stage from a maximum hard to a minimum hard characteristic but the compression stroke side is fixed at a soft position (hereinafter, referred to as an extension stroke side hard region HS). On the contrary, when the adjuster 40 is pivoted in a given clockwise direction therefrom, the damping force coefficient at the compression stroke side (phase) is only changeable to a hard region from the maximum hard to the minimum hard characteristic at the multiple stages and the damping force characteristic at in the compression stroke side is fixed to the soft position (hereinafter, referred to as a compression hard region SH).

Figure 7A:
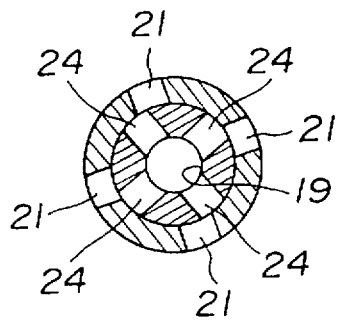
FIGS. 7A, 7B, and 7C are cross sectional views cut away along a line K—K of FIG. 4 representing an essential part of the representative shock absorber shown in FIG. 4.
Figure 7B:
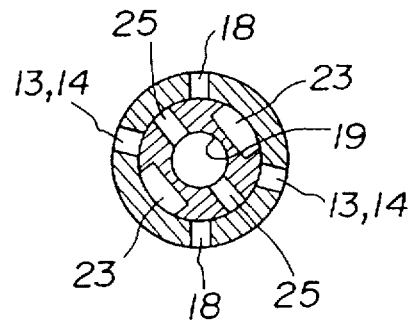
Figure 7C:
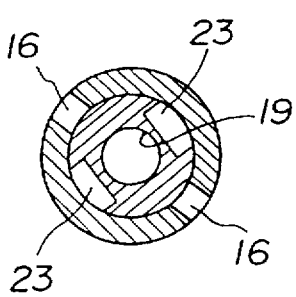
Figure 8A:
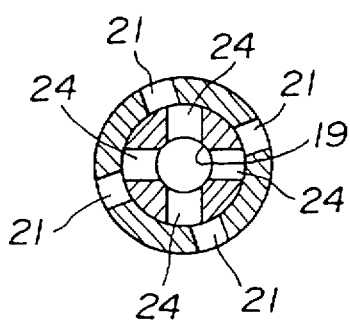
FIGS. 8A, 8B, and 8C are cross sectional views cut away along lines L—L and M—M of FIG. 4 representing an essential part of the representative shock absorber SA shown in FIGS. 3 and 4.
Figure 8B:
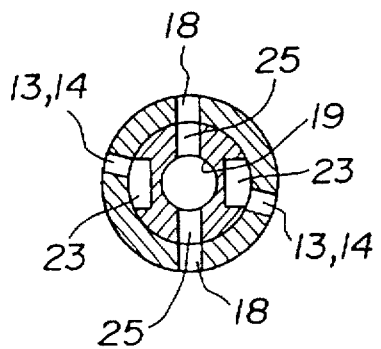
Figure 8C:
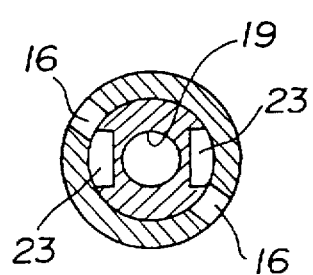
Figure 9A:
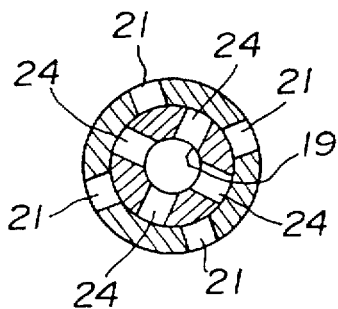
FIGS. 9A, 9B, and 9C are cross sectional views cut away along a line N—N of FIG. 4 representing an essential part of the representative shock absorber shown in FIGS. 3 and 4.
Figure 9B:
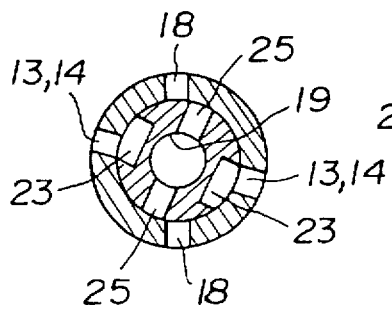
Figure 9C:
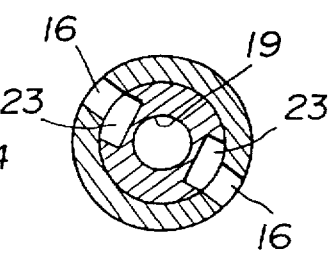

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS. 7A (①), 7B (②), and 7C (③) (K—K), 8A (①), 8B (②), and 8C (③) (L—L, M—M), 9A (①), 9B (②), and 9C (③) (N—N), respectively.

Figure 10:
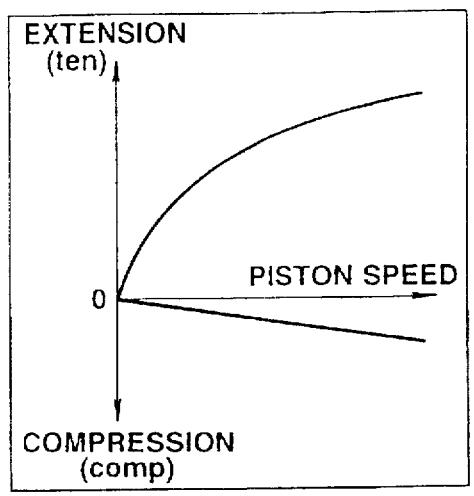
FIG. 10 is a damping force characteristic graph when an extension stroke side (phase) is in a hard damping force characteristic with respect to the piston of the representative shock absorber SA shown in FIG. 4.
Figure 11:
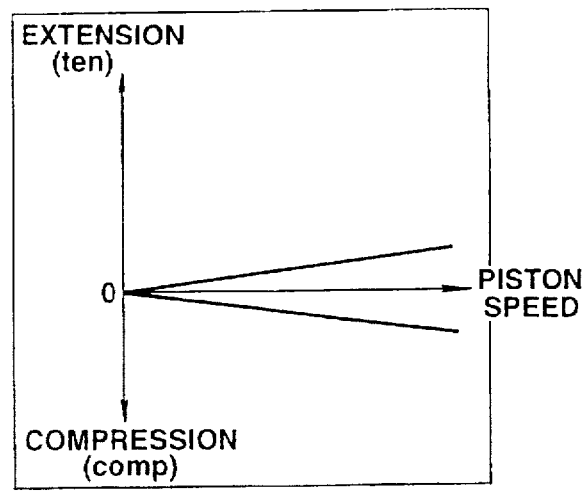
FIG. 11 is a damping force characteristic graph when both extension and compression stroke sides (phases) are in soft damping force states.
Figure 12:
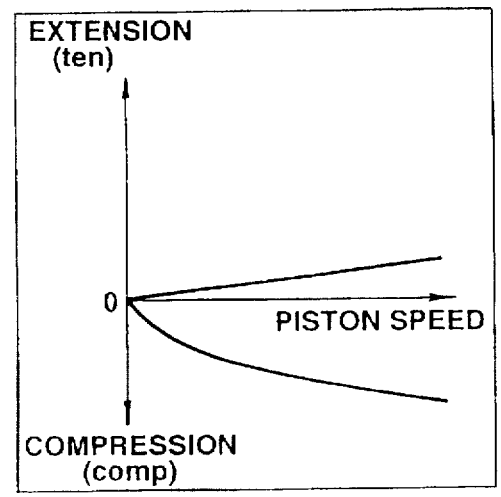
FIG. 12 is a damping force characteristic graph when the compression stroke side (phase) is in a hard damping force state.

The damping force characteristics at the respective positions ①, ②, and ③ shown in FIG. 6 are shown in FIGS. 10, 11, and 12, respectively.

FIG. 10 shows the damping force characteristic of the representative shock absorber SA when the adjuster 40 is positioned at ① of FIG. 6.

FIG. 11 shows that when the adjuster 40 is positioned at ② of FIG. 6.

FIG. 12 shows that when the adjuster 40 is positioned at ③ of FIG. 6.

Figure 14:
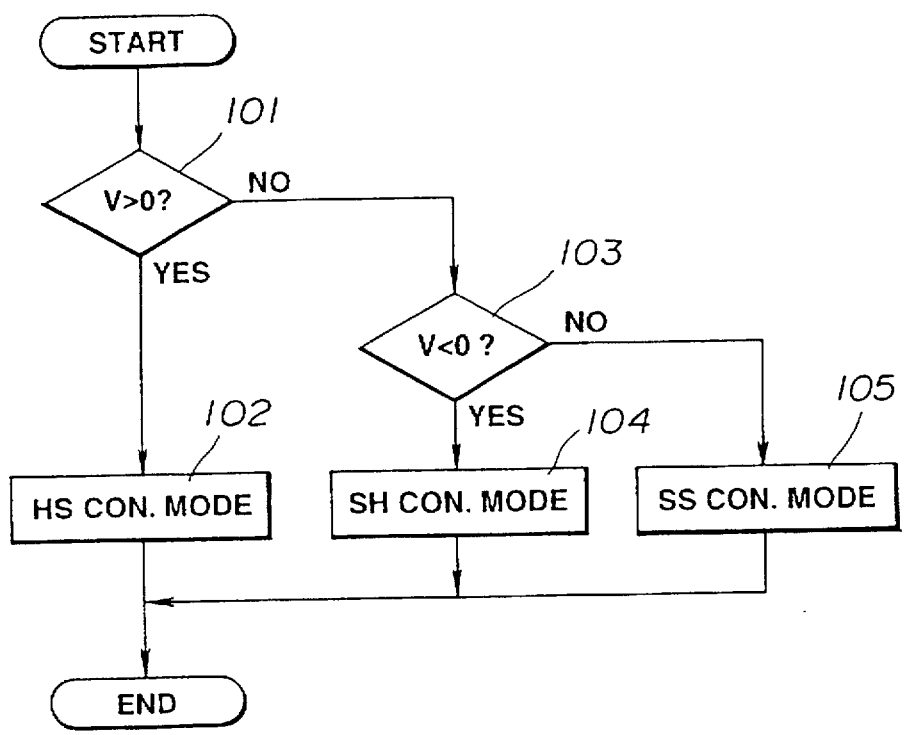
FIG. 14 is an operational flowchart executed in a control unit in the case of the first embodiment according to the present invention.

Next, FIG. 14 shows an operational flowchart for explaining the content of the damping force characteristic control operation for each shock absorber SA executed in the control unit 4.

At a step 101, the CPU 4b determines whether the formed control signal V (for each one of the shock absorbers SA) is increased and exceeds a predetermined positive threshold value $\delta_T$ (It is noted that, in the first embodiment, $\delta_T=0$). If Yes at the step 101, the routine goes to a step 102 in which the corresponding one of the shock absorber SA is set to as the extension phase hard region HS.

If NO at the step 101, the routine goes to a step 103 in which the CPU 4b determines whether the control signal V is below a predetermined negative threshold value $-\delta_c$. (It is noted that $-\delta_c$ also indicates 0 in the first embodiment).

If YES at the step 103, the routine goes to a step 104 in which the damping force characteristic of the corresponding one of the shock absorbers SA is set to as the compression phase hard region HS.

If NO at the step 103, the routine goes to a step 105, namely, if the CPU 4b determines that the value of the control signal V falls in a range from $+\delta_T$ to the minus $-\delta_c$, namely, zero, the corresponding one of the shock absorbers SA is set to as each of the respective extension and compression phases being the soft region SS.

FIG. 15A through 15E show integrally a timing chart for explaining the operation of the control unit 4 and shock absorber(s) SA in the case of the first embodiment.

First, when the control signal (V) indicates zero, each shock absorber SA is controlled in the soft control mode SS as shown in FIGS. 14, 15A, and 15D.

When the control signal V formed on the basis of the sprung mass vertical velocity $\Delta x'$ and relative velocity $(\Delta x' - \Delta x'_0)$ is varied with time as shown in FIG. 15A and the control signal V indicates positive, each shock absorber SA is controlled in the extension phase hard region HS in which the compression phase is fixed to a predetermined low damping force and the extension phase is varied to provide the hard characteristic (a target damping force characteristic position $P_T$) which is proportional to the value of the control signal V.

On the other hand, if the direction of the control signal V is minus (negative) (and below the predetermined negative threshold value $-\delta_c=0$), the compression phase hard region SH is provided so that the extension phase damping force characteristic is fixed to the low predetermined damping force characteristic and the damping force characteristic at the compression phase is varied to provide a target damping force characteristic position $P_C$ in proportion to the value of the control signal V.

A switching operation between the control modes (HS, SH, and SS) will be described with reference to FIG. 15A through 15E.

A symbol a of FIG. 15C denotes a region in which the direction of the control signal V formed on the basis of the sprung mass vertical velocity $\Delta x'$ and relative velocity $(\Delta x' - \Delta x'_0)$ is inverted from the negative value (downward) to the positive value (upward).

In the region a, the relative velocity $(\Delta x' - \Delta x'_0)$ still provides the negative value (the phase of the shock absorber SA is at the compression phase) so that the corresponding shock absorber SA is controlled at the extension phase hard region HS on the basis of the direction of the control signal V and the phase of the corresponding shock absorber SA is at the extension phase. Hence, at this region a, the extension phase from which the piston 31 of the shock absorber SA is moved away provides the hard characteristic which is proportional to the value of the control signal V.

A region b denotes a region in which the direction (direction discriminating sign) of the control signal V is still positive (upward value) and the relative velocity $(\Delta x' - \Delta x'_0)$ is switched from the negative value to the positive value (extension phase from which the piston of the corresponding shock absorber SA is moved away). At this time, since the shock absorber SA is controlled in the mode of the extension phase hard region HS on the basis of the direction of the control signal V, the stroke direction of the corresponding shock absorber SA is the extension phase. Hence, at the region b, the extension phase side of the shock absorber SA provides the hard characteristic proportional to the value of the control signal V.

A region c denotes a region in which the control signal V is inverted from the positive value (upward) to the negative value (downward). However, at this region c, since the corresponding shock absorber SA is controlled to the compression phase hard region SH on the basis of the direction (direction discriminating sign) of the control signal V, this region c provides the phase (in this region c, the extension phase) at which the piston of the corresponding shock absorber SA is moved with the soft (predetermined low damping force characteristic) characteristic.

A region d denotes a region in which the control signal V is still at the negative value (downward) and the relative velocity $(\Delta x' - \Delta x'_0)$ is changed from the positive value to the negative value (the phase at which the piston of the corresponding shock absorber SA is at the extension phase side). At this time, since the corresponding shock absorber SA is controlled at the compression phase hard region SH on the basis of the direction of the control signal. Hence, the stroke (phase) of the corresponding shock absorber is at the compression phase. In this region d, the compression phase at which the piston of the shock absorber SA is moved provides the hard characteristic proportional to the value of the control signal V.

As described above with reference to FIGS. 15A through 15C, when the control signal V based on the sprung mass vertical velocity $\Delta x'$ and relative velocity $(\Delta x'-\Delta x'_0)$ and the relative velocity of $(\Delta x'-\Delta x'_0)$ have the mutually the same direction discriminating signs (regions b and d), the instantaneous phase at which the piston of the shock absorber SA is moved is controlled at the hard characteristic mode. If the mutual signs thereof (V and $(\Delta x'-\Delta x'_0)$) are different from each other (regions a and c) , the phase at which the piston of the corresponding shock absorber SA is moved is controlled in the soft characteristic. In the first embodiment, the damping force characteristic control based on the Sky Hook theorem is carried out.

In the first embodiment, at a point of time when the phase at which the piston of the corresponding one of the shock absorbers SA is moved is ended, namely, when the region is transferred from the region a to the region b and from the region c to the region d (hard characteristic to the soft characteristic), the damping force characteristic position $P_T$ or $P_C$ at the phase to which the control is switched has already been switched to the hard characteristic side at the previous regions a and c. Consequently, the switching from the soft characteristic to the hard characteristic has been carried out without delay in time.

Next, FIG. 13 shows the configuration of a signal processing circuit for forming the control signal V by which the generation of the control force F based on an ideal Sky Hook theorem according to the sprung mass vertical velocity $\Delta x'$ and relative velocity $(\Delta x'-\Delta x'_0)$ even if the stepping motor 3 is used as the actuator which has a relatively low response characteristic such as not to be enabled to respond to the unsprung mass resonant frequency. It is noted that the signal processing circuit shown in FIG. 13 is provided for each shock absorber SA.

It is also noted that, the control unit 4 derives the four road wheel side sprung mass vertical accelerations $G_{FL}$, $G_{FR}$, $G_{RL}$, and $G_{RR}$ on the basis of the vertical acceleration signals of the vehicle body adjacent to the front right and left road wheel side shock absorbers $SA_{FL}$, $SA_{FR}$, and the rear right road wheel side shock absorber $SA_{RR}$ detected and outputted from the respective four sprung mass vertical acceleration sensors 1 ($1_{FL}$, $1_{FR}$, $1_{RL}$ and $1_{RR}$)

It is further noted that vehicular roll acceleration $G_R$ may be derived on the basis of the following equation (5) from the front right and left road wheel side vertical sprung mass acceleration signals $G_{FL}$ and $G_{FR}$.

$$G_R = (G_{FR} - G_{FL})/2 \tag{5}$$

At a first block B1, the control unit 4 integrates or passes through a low pass filter the four road wheel side sprung mass vertical accelerations $G_{FL}$, $G_{FR}$, $G_{RL}$, and $G_{RR}$ and the roll acceleration $G_R$ so as to convert the acceleration signals $G_{FL}$ through $G_R$ to sprung mass vertical velocity $\Delta x'$ (or V') ($V'_{-FL}$, $V'_{-FR}$, $V'_{-RL}$, $V'_{-RR}$) and the roll velocity $V_R$, respectively.

At the block B1, the control unit 4 may carry out a band pass filter processing in order to increase a signal isolability from those signal components except a target frequency band within which the control of the damping force characteristic is carried out. That is to say, a first band pass filter and a second band pass filter extract bounce velocity signals $V_{BFR}$, $V_{BFL}$, $V_{BRR}$, and $B_{BRL}$ within a bounce resonance frequency band of the vehicle. In addition, a third band pass filter may derive a roll velocity signal $V_R$ with a vehicular roll resonance frequency band as a target (a center).

At the block B1, the bounce coefficients $\alpha_f$ and $\alpha_r$ may be set mutually independently of the front road wheel side and rear wheel side bouncing so as to be capable of coping with a difference in a magnitude of vehicular behaviors according to the difference in the specifications (weights, spring constants, and so on) at the vehicular front road wheel side and rear road wheel side.

At the block B1, rolling coefficients $r_f$ and $r_r$ may be set independently at the front road wheel side and rear road wheel side so that the control forces against the vehicular behaviors in the rolling direction due to an external force (lateral acceleration) exerted on the vehicle body during a vehicular steering operation do not become insufficient.

At the block B1, the control unit 4 further may calculate four sprung mass component signals $V_H$ ($V_{FR-RH}$, $V_{FL-LH}$, $V_{RR-RH}$, $V_{RL-LH}$):

Front right road wheel side;

$$V_{FR-RH} = \alpha_f V_{BFR} + r_f V_R \tag{6}$$

Front left road wheel side;

$$V_{FL-LH} = \alpha_f V_{BFL} + r_f V_R \tag{7}$$

Rear right road wheel side;

$$V_{RR-RH} = \alpha_r V_{BRR} + r_r V_R \tag{8}$$

Rear left road wheel side;

$$V_{RL-LH} = \alpha_r V_{BRL} + r_r V_R \tag{9}$$

On the other hand, as shown in FIG. 13, the control unit 4 at a block B2 converts the relative displacement signals H from the respective stroke sensors 2 into the respective relative velocities between the sprung mass and unsprung mass $(\Delta x'-\Delta x'_0)$ {$(\Delta x'-\Delta x_0)_{FL}$, $(\Delta x'-\Delta x'_0)_{FR}$, $(\Delta x'-\Delta x'_0)_{RL}$, $(\Delta x'-\Delta x'_0)_{RR}$}, respectively, through, for example, differentiator(s) or high pass filter installed at the block B2.

Figure 16A:
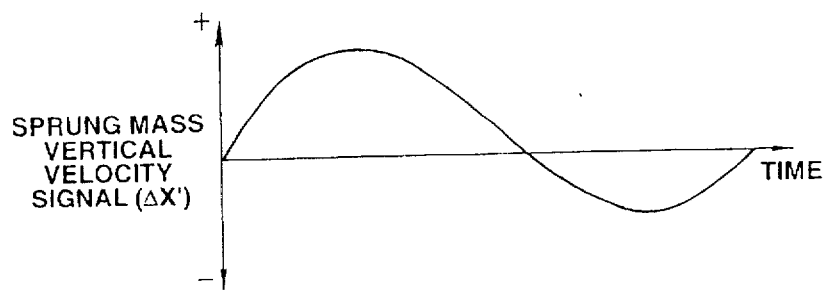
FIG. 16A, 16B, 16C, 16D, and 16E are integrally a timing chart indicating a formed state of the control signal in the signal processing circuit shown in FIG. 13.
Figure 16B:
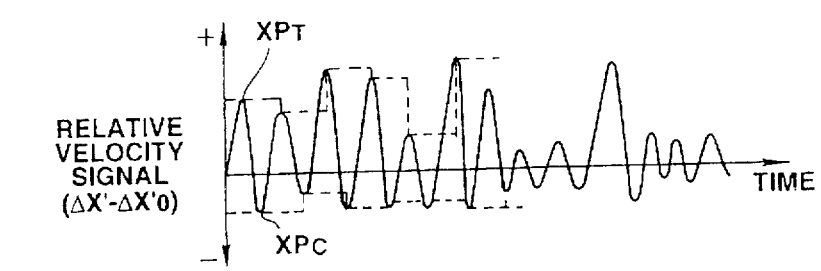
Figure 16C:
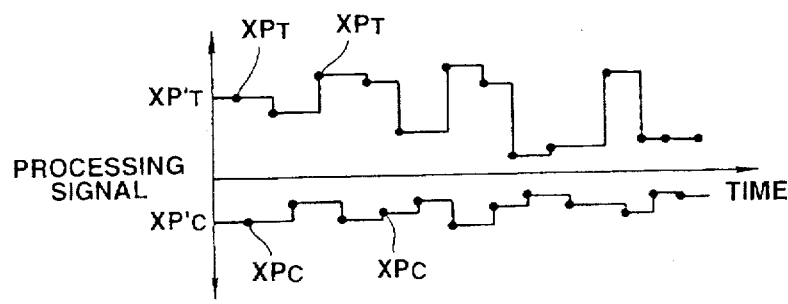

Referring to FIG. 13, at the subsequent block B3, as shown in FIG. 16C, an extension phase processing signal $XP'_T$ and a compression phase processing signal $XP'_C$ are respectively formed. That is to say, positive and negative peak values are detected as an extension phase peak value $XP_T$ and as a compression phase peak value $XP_C$ of each of the relative velocity signal $(\Delta x'-\Delta x'_0)$ according to the direction discriminating sign of the relative velocity signal (plus at the extension phase side and minus at the compression phase side) and are held until the subsequent peak values are detected respectively so that the extension phase processing signal $XP'_T$ and $XP'_C$ are respectively formed thereat.

At the subsequent block B4, both of extension phase reprocessing signal $KUS_{-T}$ ($KUS_{-FR-T}$, $KUS_{-FL-T}$, $KUS_{RR-T}$, $KUS_{-RL-C}$) which is inversely proportional to the extension phase processing signal $XP_T$ and compression phase reprocessing signal $KUS_{-C}$ ($KUS_{-FR-C}$, $KUS_{-FL-C}$, $KUS_{-RR-C}$, $KUS_{-RR-C}$, $KUS_{-RL-C}$) which is inversely proportional to the compression phase processing signal $XP_C$ are formed thereat.

That is to say, the extension phase and compression phase reprocessing signals $KUS_{-T}$ and compression phase reprocessing signals $KUS_{-C}$ are derived as follows:

$$KUS_{-T}=1/XP'_T \tag{10}$$

and $$KUS_{-C}=1/XP'_C \tag{11}$$

It is noted that if each of the extension phase processing signal $XP'_T$ and the compression phase processing signal $XP'_C$ is equal to or below a predetermined minimal value MIN ($XP'_T$, $XP'_C \leq$ MIN) ..such a processing that either of the extension or compression phase processing signal $XP'_T$ or $XP'_C$ which is equal to or below the predetermined minimal value MIN is set to a predetermined maximum value ($KUS_{-T}$, $KUS_{-C}$=MAX (1.0, 0.9)) is carried out. This processing is carried out due to prevention of the value of either of the extension phase or compression phase reprocessing signal value $KUS_{-T}$ or $KUS_{-C}$ indicates divergence to an infinite as the value of each of the processing signals $XP'_T$, $XP'_C$ which is at a denominator in the equation (10) or (11) approaches to zero.

It is noted that at a final stage of the block B4, an averaging (alternatively, moving average) may be carried out for the extension phase reprocessing signal $KUS_{-T}$ ($KUS_{-FR-T}$, $KUS_{-FL-T}$, $KUS_{-RR-T}$, $KUS_{-RL-T}$) and the compression phase reprocessing signal $KUS_{-C}$ ($KUS_{-FR-C}$, $KUS_{-FL-C}$, $KUS_{-RR-C}$, $KUS_{-RL-C}$) so as to derive the averaging processed extension phase reprocessing signal $KUS'_{-T}$ ($KUS'_{FR-T}$, $KUS'_{FL-T}$, $KUS'_{RR-T}$, $KUS'_{RL-T}$) and the averaging processed compression phase reprocessing signal $KUS'_{-C}$ ($KUS'_{FR-C}$, $KUS'_{FL-C}$, $KUS'_{RL-C}$, $KUS'_{RR-C}$).

At a block B5, the control unit 4 derives the control signal V (extension phase control signals $V_{FR-T}$, $V_{FL-T}$, $V_{RR-T}$, $V_{RL-T}$ and compression phase control signals $V_{FR-C}$, $V_{FL-C}$, $V_{RL-C}$, $V_{RR-C}$) on the basis of the following equations (12) through (15) or (16) and (12)' through (15)' or (16)' from the sprung mass component signal VH based on the sprung mass vertical velocity signal $\Delta x'$ formed at the block B1 and the (averaged) extension phase reprocessing signals $KUS'_{-T}$ and $KUS'_{-C}$ (or, alternatively, $KUS_{-T}$ and $KUS_{-C}$ without under averaging) on the basis of the relative velocity signal ($\Delta x' - \Delta x'_0$) formed at the block B1.

Front right road wheel side;

$$V_{FR-T}=g_f V_{FR-RH} KUS'_{-FR-T} \tag{12}$$

$$V_{FR-C}=g_f V_{FR-RH} KUS'_{-FR-C} \tag{12}$$

Front left road wheel side;

$$V_{FL-T}=g_f V_{FR-LH} KUS'_{-FL-T} \tag{13}$$

$$V_{FL-C}=g_f V_{FR-LH} KUS'_{-FL-C} \tag{13}$$

Rear right road wheel side;

$$V_{RR-T}=g_r V_{RR-RH} KUS'_{-RR-T} \tag{14}$$

$$V_{RR-T}=g_r V_{RR-RH} KUS'_{-RR-C} \tag{14}$$

Rear left road wheel side;

$$V_{RL-T}=g_r V_{RL-LH} KUS'_{-RL-T} \tag{15}$$

$$V_{RL-C}=g_r V_{RL-LH} KUS'_{-RL-C} \tag{15}$$

wherein $g_f$ denotes a total gain of control for the front road wheel side damping force and $g_r$ denotes a total gain of control for the rear road wheel side damping force.

It is noted that the control signal V may be derived as follows:

$$V=g \cdot \Delta x' \cdot KUS_{-T} \tag{16}$$

and $$V=g \cdot \Delta x' \cdot KUS_{-C} \tag{16}'$$

That is to say, in this embodiment, at the block B4 of FIG. 13, the extension phase processing signal $XP'_T$ and compression phase processing signal $XP'_C$ are multiplied by the sprung mass vertical velocity signal $V_{-RH}$ in such a form that the extension phase processing signal $XP'_T$ and the compression phase processing signal $XP'_C$ are once converted into the extension phase reprocessing signal $KUS'_T$ and the compression phase reprocessing signal $KUS'_C$ which are respectively inversely proportional to the corresponding one of the extension phase processing signal $XP'_T$ and compression phase processing signal $XP'_C$ (in addition, the form averaged) so that the division of the control signal by zero can be prevented.

Furthermore, during the form of the control signal V, the peak values of the relative velocity signal ($\Delta x' - \Delta x'_0$) are separately detected according to the extension phase side (plus side) and the compression phase side (minus side) and the peak values $XP_T$, $XP_C$ at the phase side which are coincident with the direction discriminating sign of the sprung mass vertical velocity Ax are used. Consequently, as shown in FIG. 16C, the extension phase and compression phase processing signals $XP'_T$ and $XP'_C$ can be derived in the low frequency state. Thus, the control signal V can be formed to indicate a low frequency state.

As described at the block B4, the averaging processing may be carried out for the extension phase reprocessing signal $KUS_{-T}$ and compression phase reproducing signal $KUS_{-C}$ so that the control signal V can be formed in the further lower frequency state.

Next, FIG. 16A through 16E show integrally a timing chart for explaining the formed state of the control signal V in the signal processing circuit shown in FIG. 13.

In this case, suppose that the sprung mass vertical velocity $\Delta x'$ is varied with time at a relatively low frequency form as shown in FIG. 16A but the relative velocity ($\Delta x' - \Delta x'_0$) is varied with time in a relatively high frequency form as shown in FIG. 16B (solid line of FIG. 16B).

As shown in black points (plotted points) of FIG. 16C, the sampled peak values $XP_T$ at the extension phase (plus side) and the sampled peak values $XP_C$ (minus side) at the compression phase in the high-frequency relative velocity ($\Delta x' - \Delta x'_0$) are detected and held until the subsequent peak values are detected. Consequently, each high-frequency relative velocity signal ($\Delta x' - \Delta x'_0$) is converted into a relatively low-frequency extension phase processing signal $XP'_T$ and compression phase processing signal $XP'_C$.

Figure 16D:
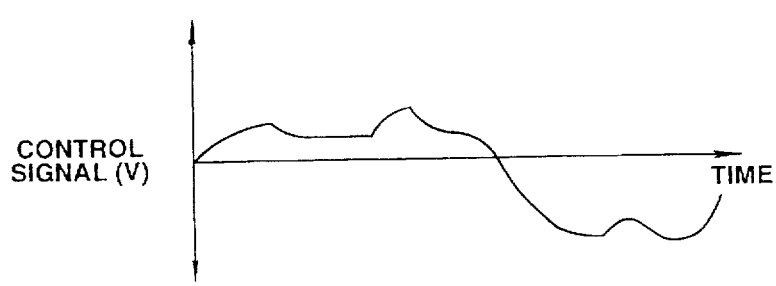
Figure 16E:
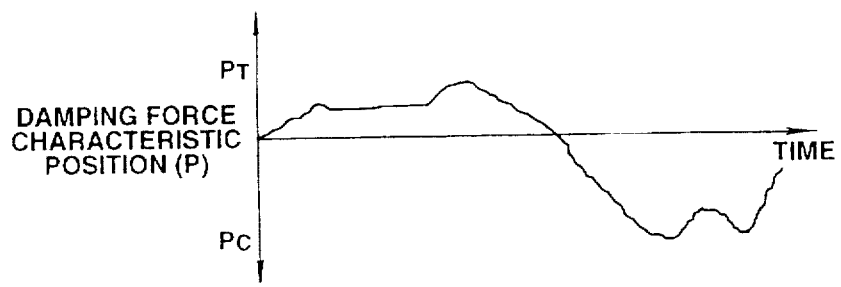

Hence, as shown in the equations (12) through (15) and equations (12)' through (15)' (or alternatively, (16) and (16)'), the varied waveform of the control signal V calculated on the basis of the above-described low-frequency signals is also derived in the relatively low-frequency waveform as shown in FIG. 16D. Thus, even though the responsive characteristic of the corresponding stepping motor 3 is not so high, the switching of the damping force characteristic position P can follow the variation in the control signal V, as shown in FIG. 16E.

The above-described operation with reference to FIGS. 16A through 16E will be described in more details with reference to the timing charts of FIGS. 17A through 17C.

Figure 17A:
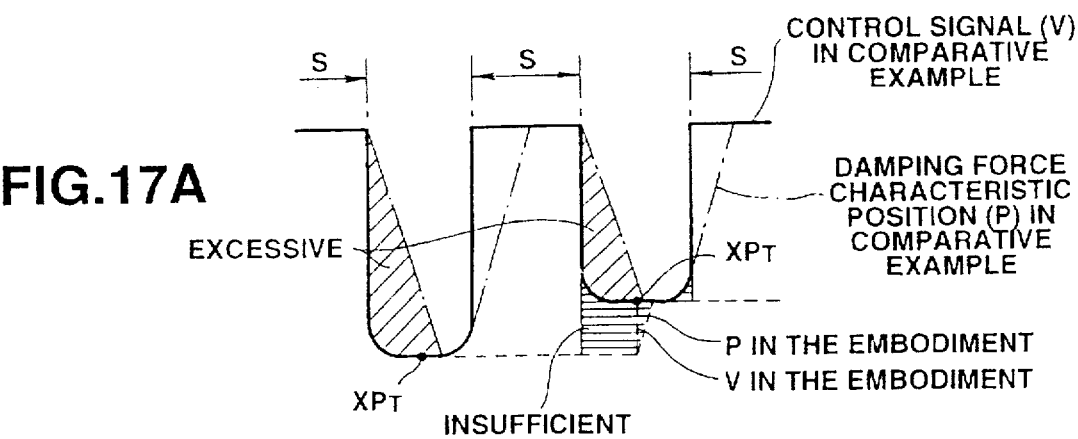
FIGS. 17A, 17B, and 17C are timing charts for explaining excessiveness and insufficiency states of a control force achieved in the case of the first embodiment shown in FIGS. 1 through 16E and in the case of a comparative example.
Figure 17B:
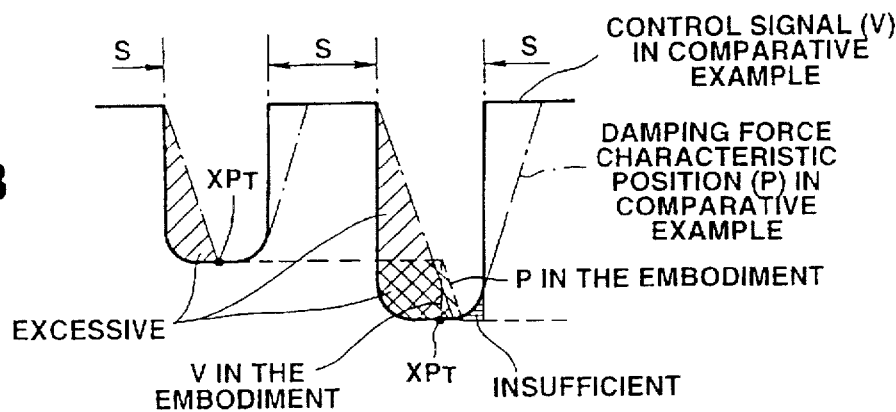
Figure 17C:
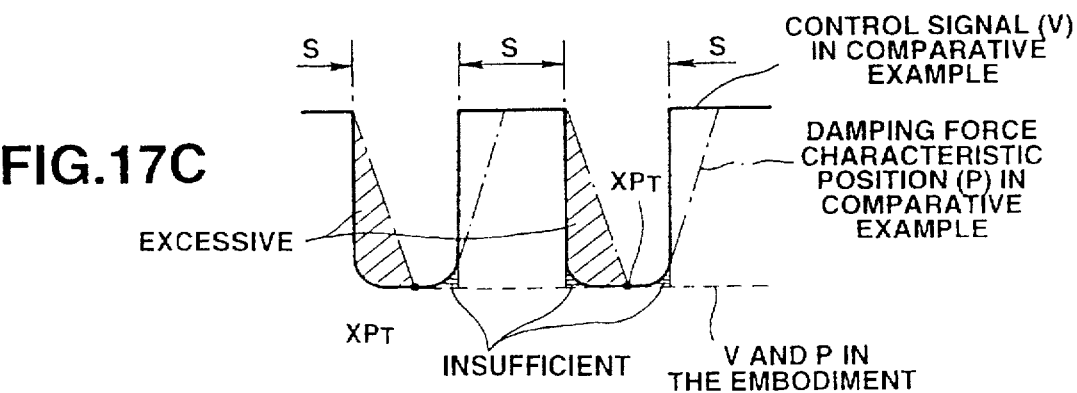

It is noted that the solid lines denoted in FIGS. 17A through 17C indicate the control signal V in a comparative example to the present invention, dot-and-dash lines denoted in FIGS. 17A through 17C indicate the damping force characteristic position P in the comparative example, and broken lines denoted in FIGS. 17A through 17C indicate the control signal V and damping force characteristic position P in the first embodiment, respectively.

First, FIG. 17A shows a case wherein the peak value $XP_T$ at the extension phase side of the relative velocity $(\Delta x' - \Delta x'_0)$ is changed from a larger value to a smaller value. In this case, the control force cannot ideally be reduced due to the switching delay to the damping force characteristic position P in the actuator, namely, the corresponding one of the stepping motors 3 according to the varying control signal at higher frequency range in the case of the comparative example and a part of the control force which indicates excessiveness in the control force is generated as denoted by left oblique lines of FIG. 18A. On the other hand, according to the control signal V in the case of the first embodiment, the parts of the control force which indicate excessive as denoted by the right oblique lines and of the control force which indicates insufficient as denoted by horizontal lines in the control force are generated.

Next, FIG. 17B shows a case wherein the peak value $XP_T$ at the extension phase of the relative velocity $(\Delta x' - \Delta x'_0)$ is, in turn, changed from the smaller value to the larger value.

In this case, according to the control signal which varies at the high frequency region in the case of the comparative example, the control force cannot ideally be reduced due to the switching delay of the damping force characteristic position P in the corresponding one of the stepping motors 3 so that parts of the control force which are excessively large as denoted by the left oblique lines of parative example. On other hand, in the case of the first embodiment, the part of the control force which indicates insufficient is generated as denoted by horizontal lines of FIG. 17B.

FIG. 17C shows a case wherein the peak value $XP_T$ at the extension phase side of the relative velocity $(\Delta x' - \Delta x'_0)$ is not changed.

In this case, according to the control signal (V) in the case of the comparative example, a part of the control force as denoted by the left oblique lines which indicates excessive is generated. However, according to the control signal V in the first embodiment, a part of the control force as denoted by the horizontal lines of FIG. 17C which indicates insufficient is generated.

As described above, even in the case of the first embodiment the excessiveness and insufficiency of the control force are generated as appreciated from FIGS. 17A through 17C. However, as compared with the case of the comparative example, areas (=energy) of the parts of the control force become reduced so that an extra control force tends difficultly able to be generated. This result can clearly be exhibited in results of simulations of FIGS. 19A and 19B.

Figure 19A:
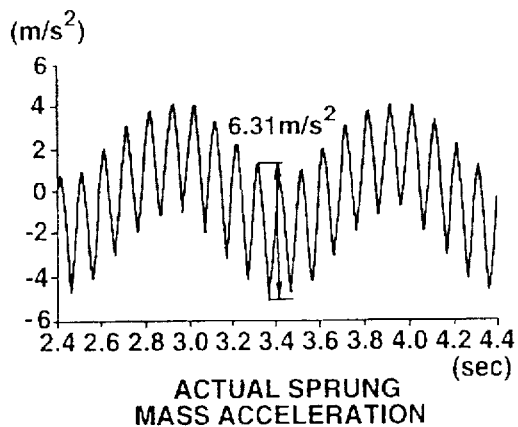
FIGS. 19A, 19AA, 19B, 19BB, and 19C are signal timing charts indicating results of simulations in the case of the first embodiment and in the case of the comparative example.
Figure 19A:
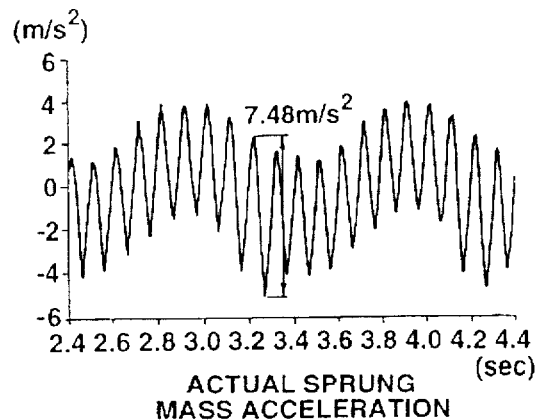
Figure 19B:
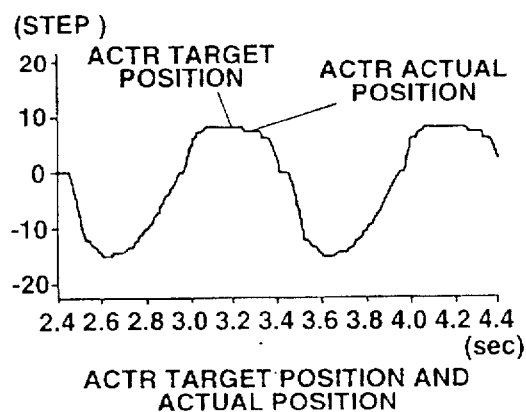
Figure 19B:
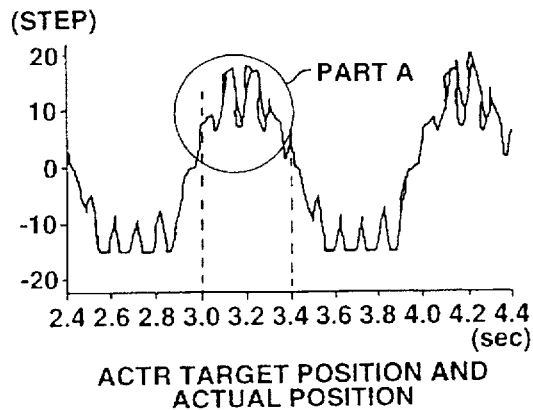

FIGS. 19A and 19B show timing charts of actual sprung mass vertical acceleration, a target position ACTR of the corresponding one of the stepping motors 3, and actual position of the corresponding one of the stepping motors 3 simulated in accordance with the first embodiment.

FIGS. 19AA, 19BB, and 19C show a timing chart of the actual sprung mass vertical acceleration, the target position ACTR and actual position of the corresponding one of the stepping motors in the case of the comparative example.

Figure 19C:
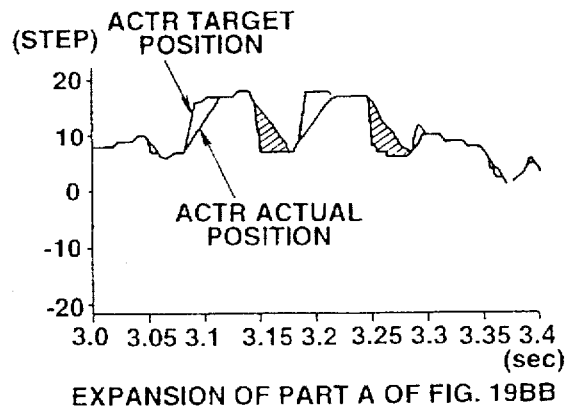

As shown in FIGS. 19A through 19C, although a large distortion in the signal waveform is generated on the actual acceleration due to the generation of the excessive control force shown in the oblique lines in the comparative example (particularly refer to FIG. 19C), the corresponding distortion hardly appears in the signal waveform of the actual sprung mass vertical acceleration in the case of the first embodiment.

It is noted that in FIGS. 16A through 16E the parts denoted by bold symbols S corresponds to vibration applied regions in which the direction discriminating signs of the sprung mass vertical velocity $\Delta x$ (since plus + indicates the extension phase) and of the relative velocity $(\Delta x' - \Delta x'_0)$ (since − minus indicates the compression phase) are not coincident with each other. At this time, since the predetermined low damping force characteristic at the opposite phase (compression phase) is acted upon, the damping force characteristic position P at the controlled phase (extension phase) is not needed to perform the variable control of the damping force characteristic as does in the case of the comparative example. Therefore, since the drive to the corresponding one of the stepping motors 3 is omitted in the vibration applied regions S, the drive responsive characteristic of each of the stepping motors 3 to the control signal V can be assured as described above and a drive/hold duty ratio of each of the stepping motors 3 can remarkably be reduced.

Figure 18A:
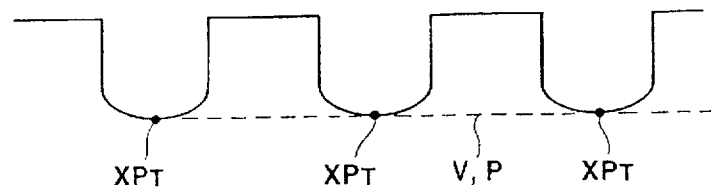
FIGS. 18A, 18B, and 18C are integrally a timing chart for explaining a duty ratio between a drive and a hold state applied to a representative stepping motor in the case of the first embodiment and in the case of a comparative example (FIG. 18C).
Figure 18B:
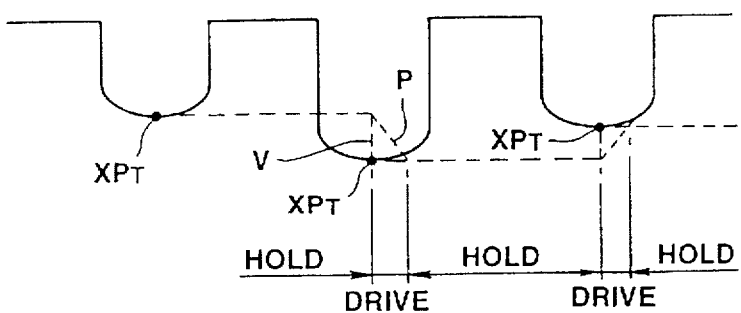
Figure 18C:
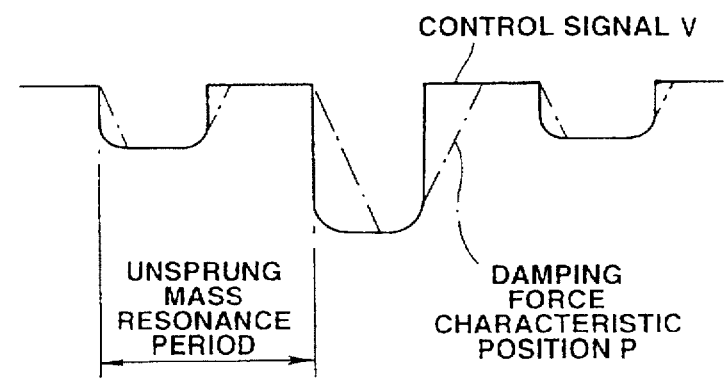

That is to say, FIG. 18A through 18C show the control signal (solid line) in the case of the comparative example and the switching state of the damping force characteristic position (dot-and-dash line) P in the case of the comparative example. In this example, the drive/hold duty ratio of the corresponding one of the stepping motors 3 indicates 30% through 50%. However, in the above example, the duty ratio value is the minimum condition. If the amplitude of the control signal becomes higher, the above-described duty ratio indicates approximately 100% since the response of the stepping motor 3 is not in time (delayed).

In addition, as a minimum responsive characteristic of the stepping motor 3, such a responsive characteristic thereof that a reciprocative drive between the extension phase hard region HS and soft region SS or between the compression hard region and the soft region SS during a period corresponding to a half period of the unsprung mass resonance frequency is required. For example, it is necessary to drive in a reciprocating form in 25 milliseconds supposing that the unsprung mass resonance frequency is 10 Hz.

On the other hand, in the case of the first embodiment, if the peak value $XP_T$ of the relative velocity $(\Delta x' - \Delta x'_0)$ at the extension phase has no variation, the drive/hold duty ratio for the stepping motor 3 indicates 0%, as shown in FIG. 18A (broken line). In addition, as shown in FIG. 18B, even if the peak value $XP_T$ at the extension phase is varied, the drive/hold duty ratio indicates only approximately 50%.

Furthermore, as the minimum responsive characteristic of the stepping motor 3, it is only necessary to drive in a reciprocating form between the extension phase region HS and soft region SS or between the compression hard region SH and the soft region SS during the period of the unsprung mass resonance frequency, i.e., during the detection of the subsequent peak value. For example, if the unsprung mass resonance frequency is 10 Hz, it is only necessary to drive in a reciprocating form in 100 milliseconds.

As described above, the suspension system damping force controlling apparatus in the first embodiment has the following advantages:

(1) It is possible to generate the control force based on the ideal Sky Hook theorem even if the inexpensive stepping motor(s) having the relatively low responsive characteristic such as not to be enabled to respond to the unsprung mass resonance frequency.

(2) Since the drive/hold duty ratio for each of the stepping motors 3 is not increased, an increase in the power consumption and a reduction of the durability of each stepping motor 3 cannot be resulted.

Next, other preferred embodiments of the suspension system damping force controlling apparatus according to the present invention will be described below. Since, in the other embodiments, the content of the signal processing circuit is different from that of the first embodiment in the control unit 4, the other structures are the same as those in the case of the first embodiment. Therefore, only the different point from the first embodiment will be explained.

(Second Embodiment)

In the suspension system damping force controlling apparatus in a second preferred embodiment, the following signal processing circuit is incorporated.

In the block B3 of FIG. 13, the extension phase processing signal $XP'_T$ and the compression phase processing signal $XP'_C$ are formed respectively in the same way as the case of the first embodiment. However, thereafter, the control signal V is formed which is proportional to a value of the instantaneous sprung mass component signal $V_H$ divided by either of the processing signal ($XP'_T$ or $XP'_C$) at the phase which corresponds to the direction discriminating sign of the sprung mass component signal $V_H$ as follows:

$$V = g \cdot V_H / XP'_T \quad (17),$$

or $$V = g \cdot V_H / XP'_C \quad (18),$$

(Or in a case where the instantaneous sprung mass component signal $V_H$ is not used, $$V = g \cdot 1/XP'_T \quad (17)'$$

or $$V = g \cdot 1/XP'_C \quad (18)').$$

(Third Embodiment)

In the suspension system damping force controlling apparatus in a third preferred embodiment, the following signal processing circuit in the control unit 4 is incorporated.

In the same way as the first embodiment, the block B2 of FIG. 13 derives the relative velocity $(\Delta x' - \Delta x'_0)$ Thereafter, an absolute value $XP_{T,C}$ of the positive and negative peak values of the relative velocity signal $(\Delta x' - \Delta x'_0)$ is detected and is held until the absolute value of the subsequent peak values is detected to form a processing signal $XP'_{T,C}$. Together with the forming of the processing signal, the control signal V is formed which is proportional to a value of the instantaneous sprung mass component signal VH divided by the processing signal $XP'_{T,C}$ as follows:

$$V = g \cdot V_H / XP'_{T,C} \quad (19),$$

(Or without derivation of VH as in the alternative case of the second embodimemt, $$V = g \cdot 1/XP'_{T,C} \quad (19)').$$

It is possible to achieve such a control as no separation between the extension phase control signal and compression phase control signal.

(Fourth Embodiment)

In the suspension system controlling apparatus of a fourth preferred embodiment according to the present invention, the following signal processing circuit in the control unit 4 is incorporated.

At the block B2 of FIG. 13, the relative velocity signal $(\Delta x' - \Delta x'_0)$ is derived in the same way as described in the first embodiment. Thereafter, an absolute value $XP_{T,C}$ of the peak value in the relative velocity $(\Delta x' - \Delta x'_0)$ is detected and held until the absolute value of the subsequent peak value is detected so as to form the processing signal $XP'_{T,C}$. Then, a reprocessing signal $KUS'_{-T,C}$ is formed which is inversely proportional to a processing signal $XP'_{T,C}$. Then, as shown in the following equations (20 and 21), the control signal V which is proportional to a value of the instantaneous sprung mass component signal $V_H$ multiplied by the reprocessing signal $KUS_{-T,C}$ is formed.

$$KUS_{-T,C} = 1/XP'_{T,C} \quad (20),$$

and $$V = g \cdot V_H \cdot KUS_{-T,C} \quad (21).$$

(Or if the sprung mass component signal $V_H$ is not formed, the equation (21) is replaced with $$V = g \cdot x' \cdot KUS_{-T,C} \quad (21).$$

(Fifth Embodiment)

In a fifth embodiment of the suspension system damping force controlling apparatus according to the present invention, averaged extension phase peak value $XP_{T-n}$ and averaged compression phase peak value $XP_{C-n}$ are derived in the second embodiment. Then, the extension phase processing signal $XP'_{T-n}$ and compression phase peak value of the averaged extension and compression phase peak values ($XP_{T-n}$, $XP_{C-n}$) as shown in the following equations (22) and (23).

$$XP_{T-n} = (\alpha \cdot XP_{T(n)} + \beta \cdot XP_{T(n-1)} + \gamma \cdot P_{T(n-2)} + \eta \cdot XP_{T(n-3)}) \times (1/(\alpha+\beta+\gamma+\eta)) \quad (22),$$

$$XP_{C-n} = (\alpha \cdot XP_{C(n)} + \beta \cdot XP_{C(n-1)} + \gamma \cdot XP_{C(n-2)} + \eta \cdot XP_{C(n-3)}) \times (1/(\alpha+\beta+\gamma+\eta)) \quad (23),$$

In the equations (22) and (23) n denotes an integer, and $\alpha, \beta, \gamma,$ and $\eta$ denote weight coefficients.

(Alternatives)

For example, although, in the above-described embodiments, the four sprung mass G sensors 1 ($1_{FL}$, $1_{FR}$, $1_{RL}$ and $1_{RR}$) are installed at vehicle body of the front left and right road wheel sides and rear right road wheel sides, the number of installed positions is arbitrary. The suspension system damping force controlling apparatus according to the present invention can be applied to that system in which the single sprung mass G sensor is only installed at the front road wheel side.

Figure 20A:
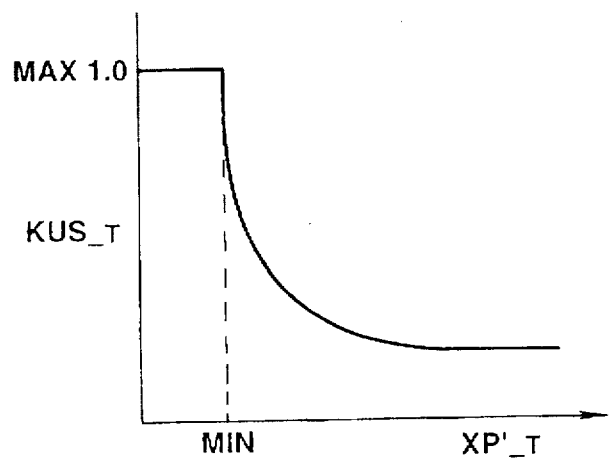
FIGS. 20A and 20B are characteristic graphs representing inverse proportion maps to form reprocessing signals in the case of an alternative of the first embodiment.
Figure 20B:
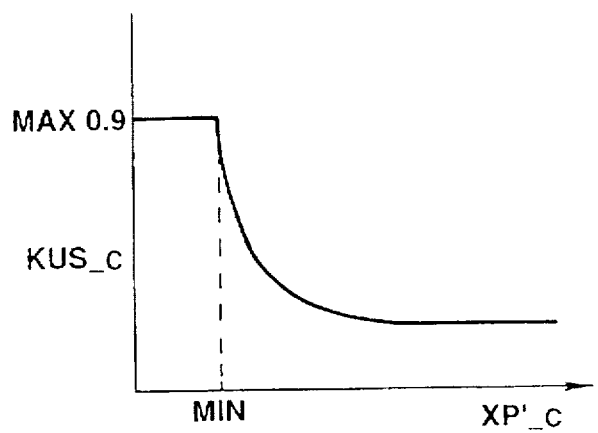

In addition, although, in the first and second embodiments, the inverse proportional functions (10) and (11) are used to form the extension phase reprocessing signal $KUS_{-C}$ and the compression phase reprocessing signal $KUS_{-C}$ and the compression phase reprocessing extension phase processing signal $XP'_T$ and to the compression phase processing signal $XP'_C$, respectively, in the block B4 of FIG. 13 and inverse proportional maps shown in FIGS. 20A and 20B may be used.

Finally, the front and rear road wheel side control gains gf and gr in the above-described equations (13) through (16) and (13)' through (16)' to derive the control signal V may be varied according to the vehicle speed detected by a vehicle speed sensor (denoted by a phantom line) shown in FIG. 2. (It is noted that the gain denoted by g may be varied with the vehicle speed)

What is claimed is:

1. An apparatus for a vehicular suspension system, said suspension system having a shock absorber interposed between a sprung mass and an unsprung mass of a corresponding one of road wheels, said apparatus comprising:

19 a) a damping force characteristic variable setter, responsive to a drive command, for variably setting a damper force characteristic at either one of an extension or compression phase of said shock absorber and for providing a relatively low damping force characteristic of either of the extension or compression phase thereof;

b) a first detector for detecting a behavior of a vehicle body as the sprung mass and outputting a first signal indicating the behavior of the vehicle body;

c) a velocity converter for converting the first signal outputted by said first detector into a second signal indicating a sprung mass vertical velocity of the sprung mass;

d) a second detector for detecting a relative displacement between the sprung mass and the unsprung mass and outputting a third signal on the basis of the detected relative displacement therebetween;

e) a control signal former for forming and outputting a control signal on the basis of the second signal outputted by said velocity converter and the third signal outputted by said second detector;

f) a controller for controlling the damping force characteristic of said shock absorber via said damping force characteristic variable setter on the basis of said control signal such that, when a direction discriminating sign of the second signal outputted by said velocity converter indicates upward with respect to the sprung mass, the damping force characteristic at the extension phase of said shock absorber is variably controlled and, when said direction discriminating sign of the second signal indicates downward with respect to the sprung mass, the damping force characteristic at the compression phase thereof is controlled; and g) an actuator associated with said damping force characteristic variable setter installed in said shock absorbers, wherein said control signal former forms the control signal in a predetermined frequency band such that a duty ratio between a drive and hold of said drive command generated according to the control signal to said actuator becomes small when no variation in said control signal occurs and becomes half even when a variation in said control signal becomes large, so that said actuator follows the variation of said control signal.

2. An apparatus for a vehicular suspension system as claimed in claim 1, wherein said control signal former comprises:

a processing signal former for detecting an absolute value of a peak value of said third signal outputted by said second detector and holding the absolute value of the peak value thereof until the absolute value of a subsequent peak value is detected so as to form a processing signal; and a reprocessing signal former for forming a reprocessing signal which is inversely proportional to said processing signal, and wherein said control signal former forms said control signal which is proportional to a value of said second signal outputted by said velocity converter multiplied by the reprocessing signal.

3. An apparatus for a vehicular suspension system as claimed in claim 1, wherein said shock absorber is provided with means for changing a damping force characteristic such that one of two phases in which said shock absorber is extended and compressed which is controlled according to a magnitude and a direction of said control signal with the other of the two phases fixed at a predetermined soft damping force characteristic and wherein, when a sign of the third signal outputted by said velocity means converter indicates upward with respect to the vehicle body, the damping force characteristic at the extension phase of the shock absorber is controlled on the basis of the control signal of said damping force characteristic controller and when the sign of the third signal indicates downward, the damping force characteristic at the compression phase is controlled on the basis of the control signal.

4. An apparatus for a vehicular suspension system as claimed in claim 1, wherein said control signal former comprises an extension phase and compression phase processing signal former for detecting a peak value of the third signal outputted by said second detector at the extension phase and holding the detected peak value until a subsequent peak value is detected, and for detecting another peak value of the third signal at the compression phase and holding the detected other peak value until a subsequent other peak value is detected so as to form extension phase processing and compression phase processing signals, respectively, said peak values being detected according to the direction discriminating sign of said third signal outputted by said second detector and wherein said control signal former forms and outputs the control signal which is proportional to a value of the second signal outputted by said velocity converter, said second signal value being divided by either one of said extension or compression phase processing signal which corresponds to the direction discriminating sign of said second signal outputted by said velocity converter.

5. An apparatus for a vehicular suspension system as claimed in claim 4, which further comprises an extension and compression phase reproducing signal former for forming and outputting extension and compression phase reprocessing signals ($KUS_{-T}$, $KUS_{-C}$) which are ($KUS_{-T}=1/XP'_T$, $KUS_{-C}=1/XP'_C$) signals inversely proportional to the extension and compression phase processing signals ($XP'_T$ and $XP'_C$) representing presently held peak values ($XP_T$, $XP_C$); and an averager for averaging both of said extension and compression phase reprocessing signals ($KUS_{-T}$, $KUS_{-C}$) to produce and output the averaged extension and compression phase processing signals ($KUS'_{-T}$, $KUS'_{-C}$), said signals being supplied to said control signal.

6. An apparatus for a vehicular suspension system as claimed in claim 1, wherein said control signal former comprises a processing signal former for detecting an absolute value of a peak value of said third signal outputted by said second detector and holding the absolute value of the peak value thereof until an absolute value of a subsequent peak value is detected so as to form a processing signal, and wherein said control signal former forms the control signal which is proportional to a value of said second signal outputted by said velocity converter, said second signal being divided by said processing signal.

7. An apparatus for a vehicular suspension system as claimed in claim 6, wherein the absolute value of the peaks of $XP_{T, C}$ is expressed as follows:

$$XP_{T,C} = (\alpha \cdot XP_{T,C(n)} + \beta \cdot XP_{T,C(n-1)} + \gamma XP_{T,C(n-2)} + \eta \cdot XP_{T,C(n-3)}) \times (1/(\alpha\beta\gamma\eta)),$$

wherein n denotes an integer, $\alpha, \beta, \gamma,$ and $\eta$ denote weight coefficients.

8. An apparatus for a vehicular suspension system as claimed in claim 1, wherein said control signal former comprises:

an extension phase and compression phase processing signal former for detecting a peak value of the third signal outputted by said second detector at the extension phase and holding the detected peak value until a subsequent peak value is detected, and for detecting another peak value of the third signal at the compression phase and holding the detected other peak value until a subsequent other peak value is detected so as to form extension phase processing and compression phase processing signals, respectively, said peak values being detected according to the direction discriminating sign of said third signal outputted by said second detector; and an extension and compression phase reprocessing signal former for forming an extension phase reprocessing signal which is inversely proportional to said extension phase processing signal and forming a compression phase reprocessing signal which is inversely proportional to said compression phase processing signal, and wherein said control signal former forms and outputs the control signal whose value is proportional to a value of the third signal outputted by said second detector multiplied by either one of the extension or compression phase reprocessing signal which corresponds to the direction discriminating sign of the second signal outputted by said velocity converter.

9. An apparatus for a vehicular suspension system as claimed in claim 8, which further comprises an average for averaging both of said extension and compression phase reprocessing signals ($KTS_{-T}$, $KUS_{-C}$) to produce and output the averaged extension and compression phase processing signals ($KUS'_{-T}$, $KUS'_{-C}$), said averaged extension phase and compression phase reprocessing signals being supplied to said control signal generator so as to generate said control signal.

10. An apparatus for a vehicular suspension system as claimed in claim 9, wherein said control signal comprises an extension phase control signal ($V_{-T}$) which is active when said shock absorber enters the extension phase and a compression phase control signal ($V_{-C}$) which is active when said shock absorber enters the compression phase, both of said extension and compression phase control signals being generated and outputted on the basis of the second signal ($\Delta x$) outputted from said velocity converter and the averaged extension and compression phase reproducing signals ($KUS'_{-T}$, $KUS'_{-C}$).

11. An apparatus for a vehicular suspension system as claimed in claim 10, wherein said shock absorber comprises four shock absorbers, all of which have a same construction, located at positions of front left, front right, rear left, and rear right road wheels, and wherein said first detector comprises four sprung mass vertical acceleration sensors, and said velocity converters respectively determine front left, front right, rear left, rear right road wheel side sprung mass vertical accelerations ($G_{FL}$, $G_{FR}$, $G_{RL}$, $G_{RR}$) according to respective sprung mass acceleration signals as the first signal derived from said sprung mass vertical acceleration sensors.

12. An apparatus for a vehicular suspension system as claimed in claim 11, which further comprises a roll acceleration determiner for determining a roll acceleration ($G_R$) on the basis of the front road wheel side sprung mass vertical accelerations ($G_{FL}$, $G_{FR}$) as follows: $G_R=(G_{FR}-G_{FL})/2$.

13. An apparatus for a vehicular suspension system as claimed in claim 12, wherein said sprung mass vertical velocity converter comprises a low pass filter.

14. An apparatus for a vehicular suspension system as claimed in claim 12, which further comprises: a band pass filter for extracting bounce velocity signals ($V_{BFR}$, $V_{BFL}$, $V_{BRL}$, $V_{BRR}$) in predetermined bouncing resonance frequency bands from the sprung mass vertical velocities ($V'_{FR}$, $V'_{FL}$, $V'_{RL}$, $V'_{RR}$) constituting the second signal and derived from said velocity converter.

15. An apparatus for a vehicular suspension system as claimed in claim 14, wherein said control signal is expressed as follows:

$$V=g \cdot V_H/XP'_{T, C}$$

wherein $XP'_{T, C}$ denotes the processing signal representing a presently held absolute value $XP_{T,C}$ of the peak values of said first signal.

16. An apparatus for a vehicular suspension system as claimed in claim 14, wherein said control signal is expressed as follows:

$$V=g \cdot V_H \cdot KUS_{-T, C}$$

wherein g denotes a predetermined control gain and $KUS_{-T, C}$ is expressed as follows:

$$KUS_{-T, C}=1/XP'_{T, C}$$

wherein $XP'_{T, C}$ denotes the reproducing signal representing the presently held value of an absolute value of the peak values of the third signal outputted by said second detector.

17. An apparatus for a vehicular suspension system as claimed in claim 14, which further comprises a sprung mass component signal determiner for determining a sprung mass component signal ($V_H$) and wherein each of said control signals ($V_H$ or $V_T$ and $V_C$) is expressed as follows:

$$V_T=g \cdot V_H/XP'_T,$$

and $$V_C=g \cdot V_H/XP'_C,$$

wherein g denotes a predetermined control gain.

18. An apparatus for a vehicular suspension system as claimed in claim 17, wherein said extension phase processing signal $XP'_{T-n}$ and compression phase processing signal $XP'_{C-n}$ are derived on the basis of the averaged peak values at the extension and compression phases as follows:

$$XP_{T-n}=(\alpha \cdot XP_{T(n)}+\beta \cdot XP_{T(n-1)}+\gamma \cdot XP_{T(n-2)}+\eta \cdot XP_{T(n-3)}) \times (1/(\alpha+\beta+\gamma+\eta)),$$

$$XP_{C-n}=(\alpha \cdot XP_{C(n)}+\beta \cdot XP_{C(n-1)}+\gamma \cdot XP_{C(n-2)}+\eta \cdot XP_{C(n-3)}) \times (1/(\alpha+\beta+\gamma+\eta)),$$

wherein n denotes an integer, $\alpha, \beta, \gamma$, and $\eta$ denote weight coefficients.

19. An apparatus for a vehicular suspension system as claimed in claim 10, which further comprises a sprung mass component signal determiner for determining sprung mass component signals ($V_H$) for the respective control signals as follows:

Front right road wheel side;

$$V_{FR-RH}=\alpha_f V_{BFR}+r_f V_R,$$

Front left road wheel side;

$$V_{FL-LH}=\alpha_f V_{BFL}-r_f V_R,$$

Rear right road wheel side;

$$V_{RR-RH}=\alpha_r V_{BRR}+r_r V_R,$$

and

Rear left road wheel side;

$$V_{RL-LH} = \alpha_f V_{BRL} - r_r \cdot V_R,$$

wherein $\alpha_f$ denotes a front road wheel side bounce coefficient, $\alpha_r$ denotes a rear road wheel side bounce coefficient, $r_f$ denotes a front road wheel side rolling coefficient, $r_r$ denotes a rear road wheel side rolling coefficient, and $V_R$ denotes a rolling component signal.

20. An apparatus for a vehicular suspension system as claimed in claim 19, wherein each of the front right, front left, rear right, and rear left extension phase and compression phase control signals ($V_{FR-T}$, $V_{FR-C}$, $V_{FL-T}$, $V_{FL-C}$, $V_{RR-T}$, $V_{RR-C}$, $V_{RL-T}$, $V_{RR-T}$) are derived as follows:

Front right road wheel side;

$$V_{FR-T} = g_f V_{FR-RH} \cdot KUS'_{-FR-T},$$
$$V_{FR-C} = g_f V_{FR-RH} \cdot KUS'_{-FR-C},$$

Front left road wheel side;

$$V_{FL-T} = g_f V_{FR-LH} \cdot KUS'_{-FL-T},$$
$$V_{FL-C} = g_f V_{FR-LH} \cdot KUS'_{-FL-C},$$

Rear right road wheel side;

$$V_{RR-T} = g_r V_{RR-RH} \cdot KUS'_{-RR-T},$$
$$V_{RR-T} = g_r V_{RR-RH} \cdot KUS'_{-RR-C},$$

Rear left road wheel side;

$$V_{RL-T} = g_r V_{RL-LH} \cdot KUS'_{-RL-T},$$
$$V_{RL-C} = g_r V_{RL-LH} \cdot KUS'_{-RL-C},$$

wherein $g_f$ denotes a total gain of control for the front road wheel side damping force and $g_r$ denotes a total gain of control for the rear road wheel side damping force.

21. An apparatus for a vehicular suspension system as claimed in claim 20, which further comprises: a comparer for comparing each of said extension phase processing signal ($XP'_T$) and said compression phase processing signal ($XP'_C$) derived by said processing signal forming means with a predetermined minimal value (MIN) so as to determine whether the signal ($XP'_T$) is equal to or smaller than the predetermined minimal value (MIN), and a setter for setting either of the extension phase processing signal ($KUS_{-T}$) or the compression phase processing signal ($KUS_{-C}$) which is determined to be equal to or smaller than (MIN) to said predetermined minimal value (MIN) to a predetermined maximum value (MAX).

22. An apparatus for a vehicular suspension system as claimed in claim 20, wherein said actuator comprises a stepping motor connected to an adjuster of each of said shock absorbers and a driver responsive to said control signal corresponding to the associated one of said shock absorbers and which is so arranged and constructed as to provide a drive signal for the stepping motor so that said adjuster adjusts the damping force at either of said extension or compression phase of said shock absorber to a target damping force.

23. An apparatus for a vehicular suspension system as claimed in claim 20, which further comprises a vehicle speed sensor which is so arranged and constructed as to detect a vehicle speed and output a vehicle speed indicative signal and wherein $g_f$ and $g_r$ are varied with the vehicle speed.

24. A method for controlling a damping force characteristic of a vehicular suspension system, said vehicular suspension system having a shock absorber which is interposed between a sprung mass of a vehicle body and an unsprung mass of a corresponding one of road wheels, said method comprising the steps of:

a) detecting a behavior of the vehicle body as the sprung mass and outputting a first signal indicating the behavior of the vehicle body;

b) converting the first signal outputted by said detecting step a) into a second signal indicating a sprung mass vertical velocity of the sprung mass;

c) detecting a relative displacement between the sprung mass and unsprung mass and outputting a third signal indicating a relative velocity between the sprung mass and unsprung mass on the basis of the detected relative displacement therebetween; and d) generating and outputting the control signal according to the second signal outputted at said step b) and third signal outputted at said step c), said control signal being supplied to an actuator so that the damping force exerted by said shock absorber is controlled, wherein said actuator is a low responsive characteristic actuator, and wherein at said step d) the control signal in a predetermined low frequency band is formed such that a duty ratio between a drive and hold of a drive command generated according to the control signal to said actuator becomes small when no variation in said control signal occurs and becomes half even when a variation in said control signal becomes large, so that actuator follows the variation of said control signal.

25. An apparatus for a vehicular suspension system, said suspension system having a shock absorber interposed between a sprung mass of a vehicle body and an unsprung mass of a corresponding one of road wheels, said apparatus comprising:

a) a damping force characteristic variable setter for variably setting a damping force characteristic at either one of an extension or compression phase of said shock absorber, said shock absorber providing a predetermined low damping force characteristic at the other of either the extension or compression phase thereof when said damping force characteristic variable setter variably sets the damping force characteristic at the one of the extension or compression phase;

b) a first detector for detecting a behavior of the vehicle body as the sprung mass and outputting a first signal indicating the behavior of the vehicle body;

c) a velocity determinator for determining a second signal indicating a sprung mass vertical velocity of the sprung mass on the basis of the first signal;

d) a second detector for detecting a relative displacement between the sprung mass and the unsprung mass and for outputting a third signal indicating a relative velocity between the sprung mass and the unsprung mass on the basis of the detected relative displacement therebetween;

e) a control signal former for forming and outputting a control signal on the basis of the second signal and the third signal; and f) a controller for controlling the damping force characteristic of said shock absorber via said damping force characteristic variable setter on the basis of said control signal such that, when a direction discriminating sign of the second signal indicates upward with respect to the sprung mass, the damping force characteristic at the extension phase of said shock absorber is variably controlled and, when said direction discriminating sign of the second signal indicates downward with respect to the sprung mass, the damping force characteristic at the compression phase of said shock absorber is variably controlled, and wherein said control signal former comprises an extension phase and compression phase processing signal former for detecting a peak value of the third signal at the extension phase, for holding the detected peak value until a subsequent peak value is detected thereby, and for detecting another peak value of the third signal at the compression phase and holding the detected other peek value until the subsequent other peak value is detected so as to form extension phase processing and compression phase processing signals, respectively thereby, said peak values being detected according to the direction discriminating sign of said third signal, and wherein said control signal former forms and outputs the control signal which is proportional to a value of said second signal, said second signal value being divided by said either one of the extension and compression phase processing signal which corresponds to the direction discriminating sign of said second signal.

26. An apparatus for a vehicular suspension system, said suspension system having a shock absorber interposed between a sprung mass of a vehicle body and an unsprung mass of a corresponding one of road wheels, said apparatus comprising:

a) a damping force characteristic variable setter for varying a damping force characteristic at either one of an extension or compression phase of said shock absorber, said shock absorber providing a predetermined low damping force characteristic at the other of either the extension or compression phase thereof when said damping force characteristic variably setter varies the damping force characteristic at the one of the extension or compression phase;

b) a first detector for detecting a behavior of the vehicle body as the sprung mass and outputting a first signal indicating the behavior of the vehicle body;

c) a velocity determinator for determining a second signal indicating a sprung mass vertical velocity of the sprung mass on the basis of the first signal;

d) a second detector for detecting a relative displacement between the sprung mass and the unsprung mass and for outputting a third signal indicating a relative velocity between the sprung mass and the unsprung mass on the basis of the detected relative displacement therebetween;

e) a control signal former for forming and outputting a control signal on the basis of the second signal and the third signal; and f) a controller for controlling the damping force characteristic of said shock absorber means via said damping force characteristic variably setter on the basis of said control signal such that, when a direction discriminating sign of the second signal indicates upward with respect to the sprung mass, the damping force characteristic at the extension phase of said shock absorber means is variably controlled and, when said direction discriminating sign of the second signal indicates downward with respect to the sprung mass, the damping force characteristic at the compression phase of said shock absorber is variably controlled, wherein said control signal former comprises a processing signal former for detecting an absolute value of the peak value thereof until the absolute signal of a peak value of said third signal and holding the absolute value of the peak value thereof until an absolute value of a subsequent peak value is detected so as to form a processing signal, and wherein said control signal former forms the control signal which is proportional to a value of the second signal, the second signal being divided by the processing signal.

27. An apparatus for a vehicular suspension system, said suspension system having a shock absorber interposed between a sprung mass of a vehicle body and an unsprung mass of a corresponding one of road wheels, said apparatus comprising:

a) a damping force characteristic variable setter for variably setting a damping force characteristic at either one of an extension or compression phase of said shock absorber, said shock absorber providing a predetermined low damping force characteristic at the other of either the extension or compression phase thereof when said damping force characteristic variable setter variably sets the damping force characteristic at the one of the extension or compression phase;

b) a first detector for detecting a behavior of the vehicle body as the sprung mass and outputting a first signal indicating the behavior of the vehicle body;

c) a velocity determinator for determining a second signal indicating a sprung mass vertical velocity of the sprung mass on the basis of the first signal;

d) a second detector for detecting a relative displacement between the sprung mass and the unsprung mass and for outputting a third signal indicating a relative velocity between the sprung mass and the unsprung mass on the basis of the detected relative displacement therebetween;

e) a control signal former for forming and outputting a control signal on the basis of the second signal and the third signal; and f) a controller for controlling the damping force characteristic of said shock absorber via said damping force characteristic variably setter on the basis of said control signal such that, when a direction discriminating sign of the second signal indicates upward with respect to the sprung mass, the damping force characteristic at the extension phase of said shock absorber is variably controlled and, when said direction discriminating sign of the second signal indicates downward with respect to the sprung mass, the damping force characteristic at the compression phase of the shock absorber is variably controlled, and wherein said control signal former comprises: a extension phase and compression phase processing signal former for detecting a peak value of the third signal at the extension phase and holding the detected peak value until a subsequent peak value is detected thereby and for detecting another peak value of the third signal at the compression phase and holding the detected other peak value until the subsequent other peak value is detected so as to form extension phase processing and compression phase processing signals, respectively thereby, said peak values being detected according to the direction discriminating sign of said third signal; and an extension and compression phase reprocessing signal former for forming an extension phase reprocessing signal which is inversely proportional to said extension phase processing signal and forming a compression phase reprocessing signal which is inversely proportional to said compression phase processing signal, and wherein said control signal former forms and outputs the control signal whose value is proportional to a value of the third signal multiplied by either one of the extension or compression phase reprocessing sign of the second signal.

28. An apparatus for a vehicular suspension system, said suspension system having a shock absorber interposed between a sprung mass of a vehicle body and an unsprung mass of a corresponding one of road wheels, said apparatus comprising:

a) a damping force characteristic variable setter for variably setting a damping force characteristic at either one of an extension or compression phase of said shock absorber, said shock absorber providing a predetermined low damping force characteristic at the other of either the extension or compression phase thereof when said damping force characteristic variably setter variably sets the damping force characteristic at the one of the extension or compression phase;

b) a first detector for detecting a behavior of the vehicle body as the sprung mass and outputting a first signal indicating the behavior of the vehicle body;

c) a velocity determinator for determining a second signal indicating a sprung mass vertical velocity of the sprung mass on the basis of the first signal;

d) a second detector for detecting a relative displacement between the sprung mass and the unsprung mass and for outputting a third signal indicating a relative velocity between the sprung mass and the unsprung mass on the basis of the detected relative displacement therebetween;

e) a control signal former for forming and outputting a control signal on the basis of the second signal and the third signal; and f) a controller for controlling the damping force characteristic of said shock absorber via said damping force characteristic variably setter on the basis of said control signal such that, when a direction discriminating sign of the second signal indicates upward with respect to the sprung mass, the damping force characteristic at the extension phase of said shock absorber is variably controlled and, when said direction discriminating sign of the second signal indicates downward with respect to the sprung mass, the damping force characteristic at the compression phase of said shock absorber is variably controlled, and wherein said control signal former comprises:

a processing signal former for detecting an absolute value of a peak value of the third signal and holding the absolute value of the peak value thereof until an absolute value of a subsequent peak value is detected so as to form a processing signal; and a reprocessing signal former for forming a reprocessing signal which is inversely proportional to the processing signal, and wherein said control signal former forms the control signal which is proportional to a value of the second signal multiplied by the reprocessing signals.

* * * * *

UNITED STATES PATENT AND TRADEMARK OFFICE
CERTIFICATE OF CORRRECTION

PATENT NO. : 5,781,873
DATED : July 14, 1998
INVENTOR(S) : Mitsuo Sasaki It is certified that error appears in the above-identified patent and that said Letters Patent is hereby corrected as shown below:

On the title page, insert the following, item [56]:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 6- | 9 | 2 | 1 | 2 | 3 | 5/94 | Japan | | | | |
| | | 4- | 6 | 3 | 7 | 1 | 2 | 2/92 | Japan | | | | |
| | | | | | | | | | | | | | |

Signed and Sealed this

Twentieth Day of April, 1999

Attest:

Q. TODD DICKINSON

*Attesting Officer*      *Acting Commissioner of Patents and Trademarks*